US012620712B2

(12) United States Patent
Kawabe

(10) Patent No.: US 12,620,712 B2
(45) Date of Patent: May 5, 2026

(54) MULTILAYER BOARD AND ANTENNA MODULE

(71) Applicant: Murata Manufacturing Co., Ltd., Nagaokakyo (JP)

(72) Inventor: Kentarou Kawabe, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 157 days.

(21) Appl. No.: 18/463,302

(22) Filed: Sep. 8, 2023

(65) Prior Publication Data

US 2024/0088565 A1 Mar. 14, 2024

(30) Foreign Application Priority Data

Sep. 13, 2022 (JP) ................................ 2022-145551
Jun. 14, 2023 (JP) ................................ 2023-097403

(51) Int. Cl.
*H01Q 1/38* (2006.01)
*H01Q 9/04* (2006.01)

(52) U.S. Cl.
CPC ............. *H01Q 9/0407* (2013.01); *H01Q 1/38* (2013.01)

(58) Field of Classification Search
CPC ............................... H01Q 9/0407; H01Q 1/38
See application file for complete search history.

(56) References Cited

U.S. PATENT DOCUMENTS

2011/0074526 A1* 3/2011 Taniguchi ............ H03H 7/1775 333/185

FOREIGN PATENT DOCUMENTS

| | | | | |
|---|---|---|---|---|
| JP | 6168258 B1 | 7/2017 | | |
| JP | 2021-005795 A | 1/2021 | | |
| JP | 2021083121 A * | 5/2021 | | H01Q 9/0442 |
| WO | 2019/189050 A1 | 10/2019 | | |

OTHER PUBLICATIONS

Office Action issued on Sep. 16, 2025, in corresponding Japanese patent Application No. 2023-097403, 3 pages.

* cited by examiner

*Primary Examiner* — Henry Luong
(74) *Attorney, Agent, or Firm* — XSENSUS LLP

(57) ABSTRACT

A multilayer board includes a multilayer body including a first radiation conductor layer, a ground conductor layer, a first wiring layer, and a second wiring layer. The first wiring layer is electrically connected to a first radiation conductor layer at a first power supply point positioned closest to a first straight line in a first outer edge and intersects but is not orthogonal to the first straight line in a view along a Z-axis direction. The second wiring layer is electrically connected to the first radiation conductor layer at a second power supply point positioned closest to a second straight line in the first outer edge and intersects but is not orthogonal to the second straight line in a view along the Z-axis direction.

18 Claims, 23 Drawing Sheets

10h

10i

MULTILAYER BOARD AND ANTENNA MODULE

CROSS-REFERENCE TO RELATED APPLICATIONS

The present application claims priority to Japanese Patent Application No. 2022-145551, filed Sep. 13, 2022, and Japanese Patent Application No. 2023-097403, filed Jun. 14, 2023, the entire contents of each of which are incorporated herein by reference.

BACKGROUND

1. Field

The present disclosure relates to a multilayer board and an antenna module that include radiation conductor layers.

2. Description of the Related Art

An antenna module described in Japanese Unexamined Patent Application Publication No. 2021-83121 is known as an invention related to a conventional multilayer board. The antenna module includes a radiation conductor layer, a first power supply point, and a second power supply point. A first high-frequency signal is input to the radiation conductor layer through the first power supply point. The radiation conductor layer radiates the first high-frequency signal. A second high-frequency signal is input to the radiation conductor layer through the second power supply point. The radiation conductor layer radiates the second high-frequency signal. The direction of polarized waves of the first high-frequency signal is different from the direction of polarized waves of the second high-frequency signal.

SUMMARY

As recognized by the inventor, in the field of the antenna module described in Japanese Unexamined Patent Application Publication No. 2021-83121, it is required to reduce the difference between the radiation pattern of the first high-frequency signal and the radiation pattern of the second high-frequency signal and prevent tilt of the radiation direction of the first high-frequency signal and the radiation direction of the second high-frequency signal with respect to the normal direction of the principal surfaces of the radiation conductor layer.

Thus, the present disclosure is intended to provide a multilayer board and an antenna module that are capable of reducing the difference between the radiation pattern of the first high-frequency signal and the radiation pattern of the second high-frequency signal and preventing tilt of the radiation direction of the first high-frequency signal and the radiation direction of the second high-frequency signal with respect to the normal direction of the principal surfaces of the radiation conductor layer.

A multilayer board according to an embodiment of the present disclosure includes: a multilayer body having a structure in which a plurality of insulator layers are laminated in a Z-axis direction; a first radiation conductor layer provided in the multilayer body and having a first outer edge in a view along the Z-axis direction, the first outer edge including a first straight line and a second straight line; a ground conductor layer provided in the multilayer body, positioned on a negative side of the first radiation conductor layer along a Z axis, and overlapping the first radiation conductor layer in a view along the Z-axis direction; a first wiring layer provided in the multilayer body, positioned on the negative side of the first radiation conductor layer along the Z axis and on a positive side of the ground conductor layer along the Z axis, electrically connected to the first radiation conductor layer at a first power supply point, and intersecting but not orthogonal to the first straight line in a view along the Z-axis direction, the first power supply point being positioned closest to the first straight line in the first outer edge; and a second wiring layer provided in the multilayer body, positioned on the negative side of the first radiation conductor layer along the Z axis and on the positive side of the ground conductor layer along the Z axis, electrically connected to the first radiation conductor layer at a second power supply point, and intersecting but not orthogonal to the second straight line in a view along the Z-axis direction, the second power supply point being positioned closest to the second straight line in the first outer edge.

An antenna module according to an embodiment of the present disclosure includes: a first substrate; and a second substrate that is flexible, in which the first substrate includes a first multilayer body having a structure in which a plurality of insulator layers are laminated in a Z-axis direction, a first radiation conductor layer provided in the first multilayer body and having a first outer edge in a view along the Z-axis direction, the first outer edge including a first straight line and a second straight line, a first wiring layer provided in the first multilayer body, positioned on a negative side of the first radiation conductor layer along a Z axis, electrically connected to the first radiation conductor layer at a first power supply point, and intersecting but not orthogonal to the first straight line in a view along the Z-axis direction, the first power supply point being positioned closest to the first straight line in the first outer edge, and a second wiring layer provided in the first multilayer body, positioned on the negative side of the first radiation conductor layer along the Z axis, electrically connected to the first radiation conductor layer at a second power supply point, and intersecting but not orthogonal to the second straight line in a view along the Z-axis direction, the second power supply point being positioned closest to the second straight line in the first outer edge, the second substrate includes a second multilayer body having a structure in which a plurality of insulator layers are laminated in the Z-axis direction, a seventh wiring layer provided in the second multilayer body and electrically connected to the first wiring layer, an eighth wiring layer provided in the second multilayer body and electrically connected to the second wiring layer, and a ground conductor layer provided in the second multilayer body, positioned on a negative side of the seventh wiring layer and the eighth wiring layer along the Z axis, and overlapping the first radiation conductor layer, the seventh wiring layer, and the eighth wiring layer in a view along the Z-axis direction, a length of the second substrate in the Z-axis direction is shorter than a length of the first substrate in the Z-axis direction, and the second substrate is positioned on a negative side of the first substrate along the Z axis and has a region not overlapping the first substrate in a view along the Z-axis direction.

According to the present disclosure, it is possible to decrease the difference between the radiation pattern of a first high-frequency signal and the radiation pattern of a second high-frequency signal and prevent tilt of the radiation direction of the first high-frequency signal and the radiation direction of the second high-frequency signal with respect to the normal direction of the principal surfaces of the radiation conductor layer.

DETAILED DESCRIPTION

Embodiment

Structure of Multilayer Board 10

Figure 1:
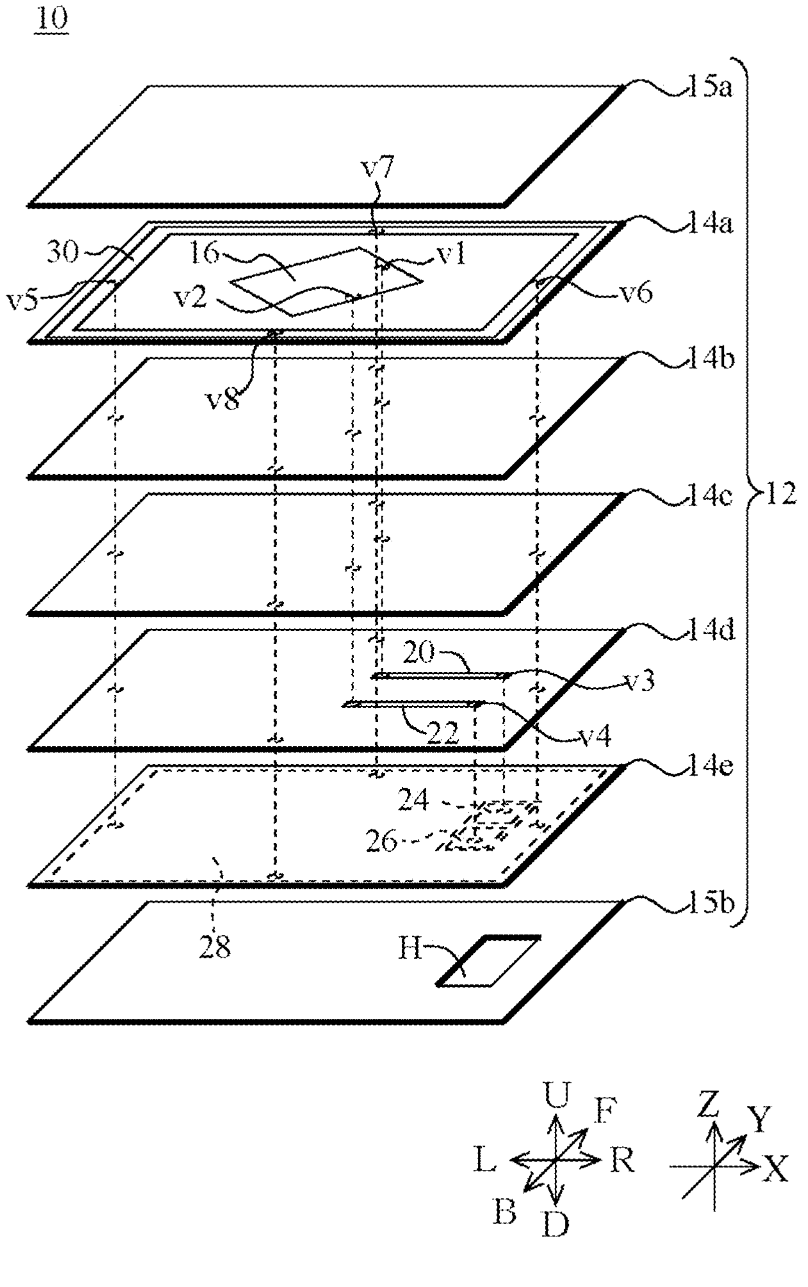
FIG. 1 is an exploded perspective view of a multilayer board.
Figure 2:
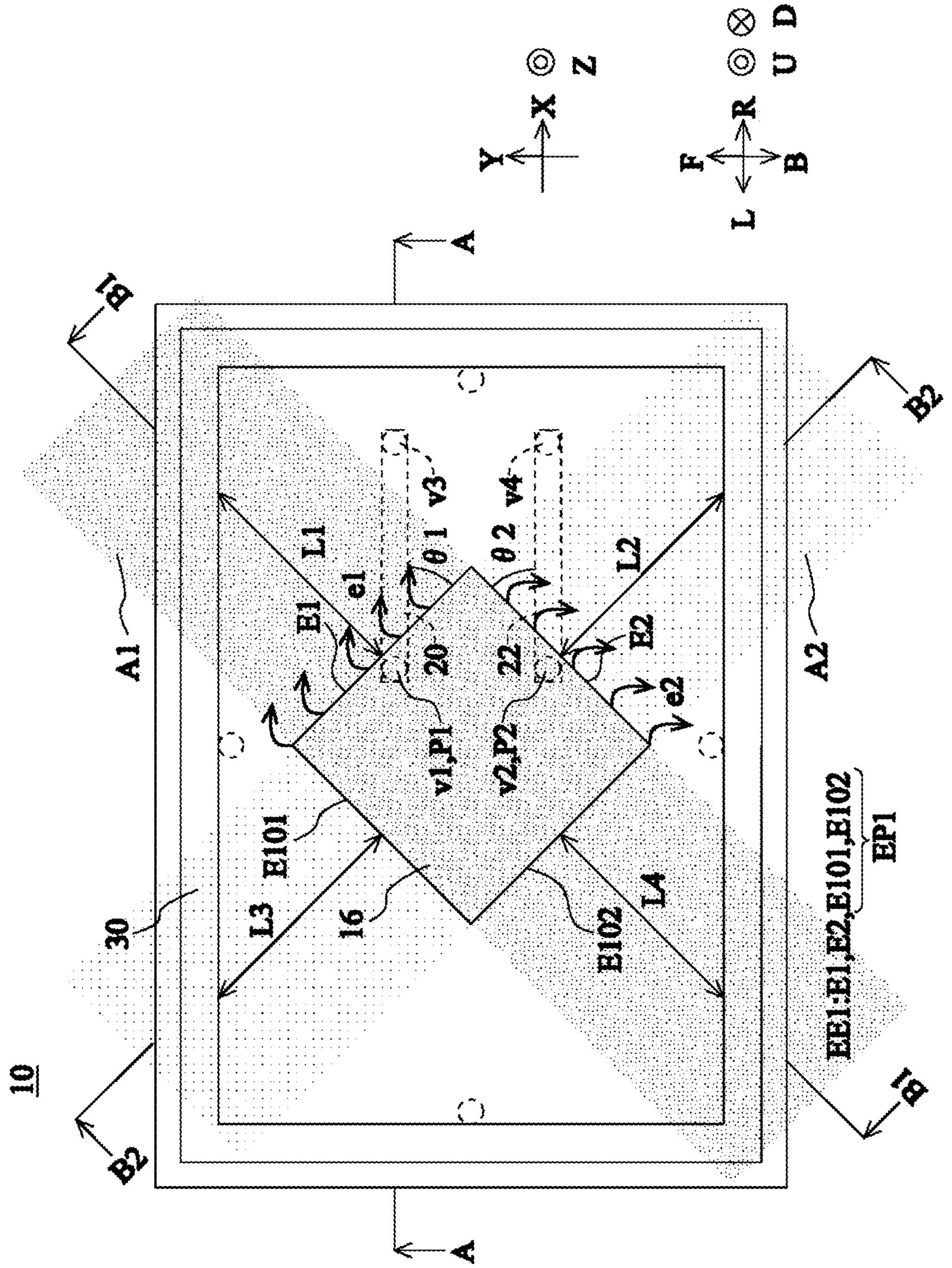
FIG. 2 is a perspective diagram of the multilayer board from above.
Figure 3:
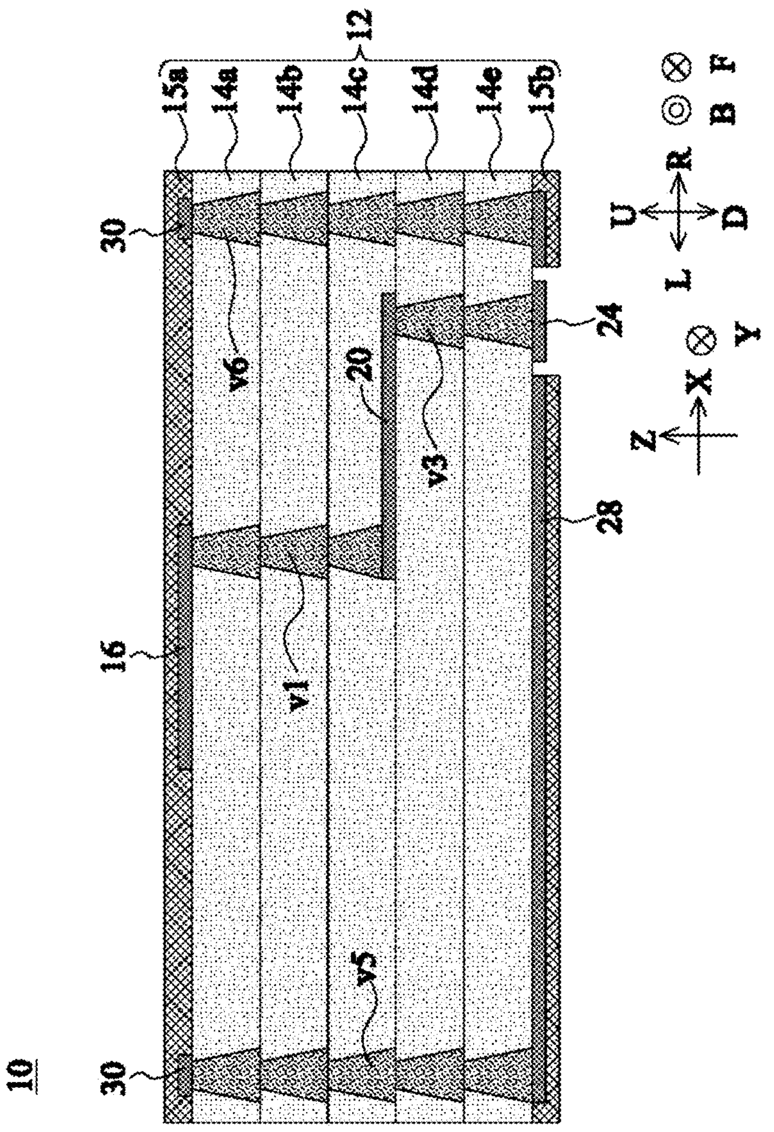
FIG. 3 is a cross-sectional view of the multilayer board.

The structure of a multilayer board 10 according to an embodiment of the present disclosure will be described below with reference to the accompanying drawings. FIG. 1 is an exploded perspective view of the multilayer board 10. FIG. 2 is a perspective diagram of the multilayer board 10 from above. FIG. 3 is a cross-sectional view of the multilayer board 10. FIG. 3 is a cross-sectional view along line A-A in FIG. 2.

In the following description, an up-down direction is defined to be the lamination direction of a multilayer body 12. The up-down direction matches with a Z-axis direction. The up direction is the positive direction of the Z axis. The down direction is the negative direction of the Z axis. A right-left direction and a front-back direction are defined to be two respective directions in which sides of the multilayer body 12 when the multilayer body 12 is viewed in the up-down direction extend. The right-left direction is orthogonal to the up-down direction. The front-back direction is orthogonal to the up-down direction and the right-left direction. The right-left direction matches with an X-axis direction. The right direction is the positive direction of the X axis. The left direction is the negative direction of the X axis. The front-back direction matches with a Y-axis direction. The front direction is the positive direction of the Y axis. The back direction is the negative direction of the Y axis. Accordingly, the X axis, the Y axis, and the Z axis are orthogonal to one another. The definitions of the directions in the present specification are exemplary. Thus, the directions in the present specification do not necessarily need to match with directions when the multilayer board 10 is actually used. The up-down direction may be inverted in the drawings. Similarly, the right-left direction may be inverted in the drawings. The front-back direction may be inverted in the drawings.

The multilayer board 10 is used for a wireless communication terminal such as a smartphone. As illustrated in FIG. 1, the multilayer board 10 includes the multilayer body 12, a first radiation conductor layer 16, a first wiring layer 20, a second wiring layer 22, outer electrodes 24 and 26, a ground conductor layer 28, an annular ground conductor layer 30, and interlayer connection conductors v1 to v8. The first radiation conductor layer 16, the first wiring layer 20, the second wiring layer 22, the outer electrodes 24 and 26, the ground conductor layer 28, the annular ground conductor layer 30, and the interlayer connection conductors v1 to v8 are provided in the multilayer body 12.

The multilayer body 12 has a plate shape. As illustrated in FIG. 1, the multilayer body 12 has a rectangular shape in a view along the up-down direction. The multilayer body 12 has a structure in which insulator layers 14*a* to 14*e* and protective layers 15*a* and 15*b* are laminated in the up-down direction (Z-axis direction). The protective layer 15*a*, the insulator layers 14*a* to 14*e*, and the protective layer 15*b* are arranged in the stated order from top. The material of the insulator layers 14*a* to 14*e* is thermoplastic resin such as polyimide or liquid crystal polymer. The multilayer body 12 is flexible. The protective layers 15*a* and 15*b* will be described later.

The first radiation conductor layer 16 radiates and/or receives a first high-frequency signal. In the present embodiment, the first radiation conductor layer 16 is positioned on the upper principal surfaces of the insulator layer 14*a*. As illustrated in FIG. 1, the first radiation conductor layer 16 has a rectangular shape in a view along the up-down direction. As illustrated in FIG. 1, the first radiation conductor layer 16 has a rhombic shape having diagonal lines extending in the front-back direction and the right-left direction in a view along the up-down direction.

Specifically, as illustrated in FIG. 2, the first radiation conductor layer 16 has a first outer edge EE1 including a first straight line E1, a second straight line E2, and straight lines E101 and E102 (a seventh straight line and an eighth straight line) in a view along the up-down direction (Z-axis direction). A first part EP1 is a part in the first outer edge EE1 except for the first straight line E1 and the second straight line E2. In other words, the first part EP1 is the straight lines E101 and E102.

The first straight line E1 and the straight line E102 are parallel to each other. The second straight line E2 and the straight line E101 are parallel to each other. The second straight line E2 is orthogonal to the first straight line E1 in a view along the up-down direction (Z-axis direction). The straight line E101 is orthogonal to the straight line E102 in a view along the up-down direction (Z-axis direction). The right rear end of the first straight line E1 (its end on the positive side along the X axis) is connected to the right front end of the second straight line E2 (its end on the positive side along the X axis). The left front end of the first straight line E1 is connected to the right front end of the straight line E101. The left back end of the second straight line E2 is connected to the right back end of the straight line E102. The left back end of the straight line E101 is connected to the left front end of the straight line E102.

The lengths of the first straight line E1, the second straight line E2, and the straight lines E101 and E102 are equal to one another. The lengths of the first straight line E1, the second straight line E2, and the straight lines E101 and E102 are, for example, ½ of the wavelength of the first high-frequency signal.

As illustrated in FIGS. 1 and 3, the ground conductor layer 28 is positioned on the lower side of the first radiation conductor layer 16 (on the negative side thereof along the Z axis). The ground conductor layer 28 is provided on the lower principal surface of the insulator layer 14*e*. As illustrated in FIG. 1, the ground conductor layer 28 has a rectangular shape in a view along the up-down direction. The long sides of the ground conductor layer 28 extend in the right-left direction. The short sides of the ground conductor layer 28 extend in the front-back direction. The ground conductor layer 28 overlaps the first radiation conductor layer 16 in a view along the up-down direction. The ground conductor layer 28 is connected to ground potential.

As illustrated in FIGS. 1 and 3, the annular ground conductor layer 30 is positioned on the upper side of the ground conductor layer 28 (on the positive side thereof along the Z axis). In the present embodiment, the position of the annular ground conductor layer 30 in the up-down direction is the same as the position of the first radiation conductor layer 16 in the up-down direction. Accordingly, the annular ground conductor layer 30 is positioned on the upper principal surface of the insulator layer 14*a*.

The annular ground conductor layer 30 has an annular shape surrounding the first radiation conductor layer 16 in a view along the up-down direction (Z-axis direction). Outer and inner edges of the annular ground conductor layer 30 each have a rectangular shape having two sides extending in the front-back direction and two sides extending in the right-left direction. The annular ground conductor layer 30 is connected to the ground potential.

Distances L1 to L4 illustrated in FIG. 2 are defined as described below. The distance L1 (first distance), the distance L2 (second distance), the distance L3 (third distance), and the distance L4 (fourth distance) are equal to one another.

- Distance L1: distance from the center of the first straight line E1 to the annular ground conductor layer 30 in a direction orthogonal to the first straight line E1
- Distance L2: distance from the center of the second straight line E2 to the annular ground conductor layer 30 in a direction orthogonal to the second straight line E2
- Distance L3: distance from the center of the straight line E101 (seventh straight line) to the annular ground conductor layer 30 in a direction orthogonal to the straight line E101 (seventh straight line)
- Distance L4: distance from the center of the straight line E102 (eighth straight line) to the annular ground conductor layer 30 in a direction orthogonal to the straight line E102 (eighth straight line)

As illustrated in FIG. 1, the first wiring layer 20 is positioned on the lower side of the first radiation conductor layer 16 (on the negative side thereof along the Z axis) and on the upper side of the ground conductor layer 28 (on the positive side thereof along the Z axis). In the present embodiment, the first wiring layer 20 is positioned on the upper principal surface of the insulator layer 14*d*. The first wiring layer 20 has a linear shape extending in the right-left direction in a view along the up-down direction. The left end of the first wiring layer 20 overlaps the first radiation conductor layer 16 in a view along the up-down direction. The right end of the first wiring layer 20 does not overlap the first radiation conductor layer 16 in a view along the up-down direction. Accordingly, the first wiring layer 20 intersects but is not orthogonal to the first straight line E1 in a view along the up-down direction (Z-axis direction). In the present embodiment, an angle θ1 between the first wiring layer 20 and the first straight line E1 is 45°. However, the angle θ1 is not limited to 45° but may be 0° to 90°. The angle θ1 is, for example, 45°±22.5°.

As illustrated in FIG. 2, a first region A1 is defined to be a region through which the first straight line E1 passes in a view along the up-down direction (Z-axis direction) when the first straight line E1 is moved in the direction orthogonal to the first straight line E1. The first wiring layer 20 is disposed in both the first region A1 and a region outside the first region A1 in a view along the up-down direction (Z-axis direction). The left end of the first wiring layer 20 is positioned inside the first region A1 in a view along the up-down direction. The right end of the first wiring layer 20 is positioned outside the first region A1 in a view along the up-down direction.

The second wiring layer 22 is positioned on the lower side of the first radiation conductor layer 16 (on the negative side thereof along the Z axis) and on the upper side of the ground conductor layer 28 (on the positive side thereof along the Z axis). In the present embodiment, the second wiring layer 22 is positioned on the upper principal surface of the insulator layer 14*d*. The second wiring layer 22 is positioned on the back side of the first wiring layer 20 in a view along the up-down direction. The second wiring layer 22 has a linear shape extending in the right-left direction in a view along the up-down direction. Accordingly, the second wiring layer 22 is parallel to the first wiring layer 20. The left end of the second wiring layer 22 overlaps the first radiation conductor layer 16 in a view along the up-down direction. The right end of the second wiring layer 22 does not overlap the first radiation conductor layer 16 in a view along the up-down direction. Accordingly, the second wiring layer 22 intersects but is not orthogonal to the second straight line E2 in a view along the up-down direction (Z-axis direction). In the present embodiment, an angle θ2 between the second wiring layer 22 and the second straight line E2 is 45°. However, the angle θ2 is not limited to 45° but may be 0° to 90°. The angle θ2 is, for example, 45°±22.5°.

As illustrated in FIG. 2, a second region A2 is defined to be a region through which the second straight line E2 passes in a view along the up-down direction (Z-axis direction) when the second straight line E2 is moved in the direction orthogonal to the second straight line E2. The second wiring layer 22 is disposed in both the second region A2 and a region outside the second region A2 in a view along the up-down direction (Z-axis direction). The left end of the second wiring layer 22 is positioned inside the second region A2 in a view along the up-down direction. The right end of the second wiring layer 22 is positioned outside the second region A2 in a view along the up-down direction.

As illustrated in FIG. 1, the outer electrodes 24 and 26 are provided on the lower principal surface of the insulator layer 14*e*. The outer electrodes 24 and 26 do not contact the ground conductor layer 28. Accordingly, the outer electrodes 24 and 26 are positioned in an opening provided through the ground conductor layer 28.

The outer electrode 24 overlaps a right end portion of the first wiring layer 20 in a view along the up-down direction. The outer electrode 26 overlaps a right end portion of the second wiring layer 22 in a view along the up-down direction. The first high-frequency signal is input to or output from the outer electrode 24. A second high-frequency signal is input to or output from the outer electrode 26.

The interlayer connection conductor v1 electrically connects the first radiation conductor layer 16 and the first wiring layer 20. More specifically, the interlayer connection conductor v1 penetrates through the insulator layers 14*a* to 14*c* in the up-down direction. The upper end of the interlayer connection conductor v1 contacts the first radiation conductor layer 16 at a first power supply point P1. The first power supply point P1 is positioned closest to the first straight line E1 in the first outer edge EE1. In the present embodiment, the first power supply point P1 is positioned closest to the middle point of the first straight line E1 in the first straight line E1. The lower end of the interlayer connection conductor v1 contacts a left end portion of the first wiring layer 20. Accordingly, the first wiring layer 20 is electrically connected to the first radiation conductor layer 16 at the first power supply point P1.

The interlayer connection conductor v2 electrically connects the first radiation conductor layer 16 and the second wiring layer 22. More specifically, the interlayer connection conductor v2 penetrates through the insulator layers 14*a* to 14*c* in the up-down direction. The upper end of the interlayer connection conductor v2 contacts the first radiation conductor layer 16 at a second power supply point P2. The second power supply point P2 is positioned closest to the second straight line E2 in the first outer edge EE1. In the present embodiment, the second power supply point P2 is positioned closest to the middle point of the second straight line E2 in the second straight line E2. The lower end of the interlayer connection conductor v2 contacts a left end portion of the second wiring layer 22. Accordingly, the second wiring layer 22 is electrically connected to the first radiation conductor layer 16 at the second power supply point P2.

The interlayer connection conductor v3 electrically connects the first wiring layer 20 and the outer electrode 24. More specifically, the interlayer connection conductor v3 penetrates through the insulator layers 14*d* and 14*e* in the up-down direction. The upper end of the interlayer connection conductor v3 contacts the right end portion of the first wiring layer 20. The lower end of the interlayer connection conductor v3 contacts the outer electrode 24.

The interlayer connection conductor v4 electrically connects the second wiring layer 22 and the outer electrode 26. More specifically, the interlayer connection conductor v4 penetrates through the insulator layers 14*d* and 14*e* in the up-down direction. The upper end of the interlayer connection conductor v4 contacts the right end portion of the second wiring layer 22. The lower end of the interlayer connection conductor v4 contacts the outer electrode 26.

The interlayer connection conductors v5 to v8 electrically connect the ground conductor layer 28 and the annular ground conductor layer 30. More specifically, the interlayer connection conductors v5 to v8 penetrate through the insulator layers 14*a* to 14*e* in the up-down direction. Upper ends of the interlayer connection conductors v5 to v8 contact the annular ground conductor layer 30. Lower ends of the interlayer connection conductors v5 to v8 contact the ground conductor layer 28.

The first radiation conductor layer 16, the first wiring layer 20, the second wiring layer 22, the outer electrodes 24 and 26, the ground conductor layer 28, and the annular ground conductor layer 30 as described above are formed by patterning metal foil attached to the upper and lower principal surfaces of the insulator layers 14*a* to 14*e*. The metal foil is, for example, copper foil. The interlayer connection conductors v1 to v8 are formed by filling, with conductive paste, through-holes penetrating through the insulator layers 14*a* to 14*e* in the up-down direction and solidifying the conductive paste through heating and pressurization.

The protective layers 15*a* and 15*b* have dielectric constants larger than the dielectric constants of the insulator layers 14*a* to 14*e*. The protective layer 15*a* covers the upper principal surface of the insulator layer 14*a*. Accordingly, the protective layer 15*a* protects the first radiation conductor layer 16 and the annular ground conductor layer 30. The protective layer 15*b* covers the lower principal surface of the insulator layer 14*e*. Accordingly, the protective layer 15*b* protects the ground conductor layer 28. However, an opening H is provided through the protective layer 15*b*. Accordingly, the outer electrodes 24 and 26 are exposed to the outside of the multilayer board 10 through the opening H.

In the multilayer board 10 as described above, the first radiation conductor layer 16 and the ground conductor layer 28 function as a patch antenna that radiates or receives the first high-frequency signal and the second high-frequency signal. However, the polarization direction of the first high-frequency signal is different from the polarization direction of the second high-frequency signal. Specifically, the first power supply point P1 is positioned near the first straight line E1. The second power supply point P2 is positioned near the second straight line E2. The first straight line E1 is orthogonal to the second straight line E2. Accordingly, the polarization direction of the first high-frequency signal is orthogonal to the polarization direction of the second high-frequency signal. The polarization directions of the first high-frequency signal and the second high-frequency signal at reception are the same as the polarization directions of the first high-frequency signal and the second high-frequency signal at transmission.

Effects

Figure 4:
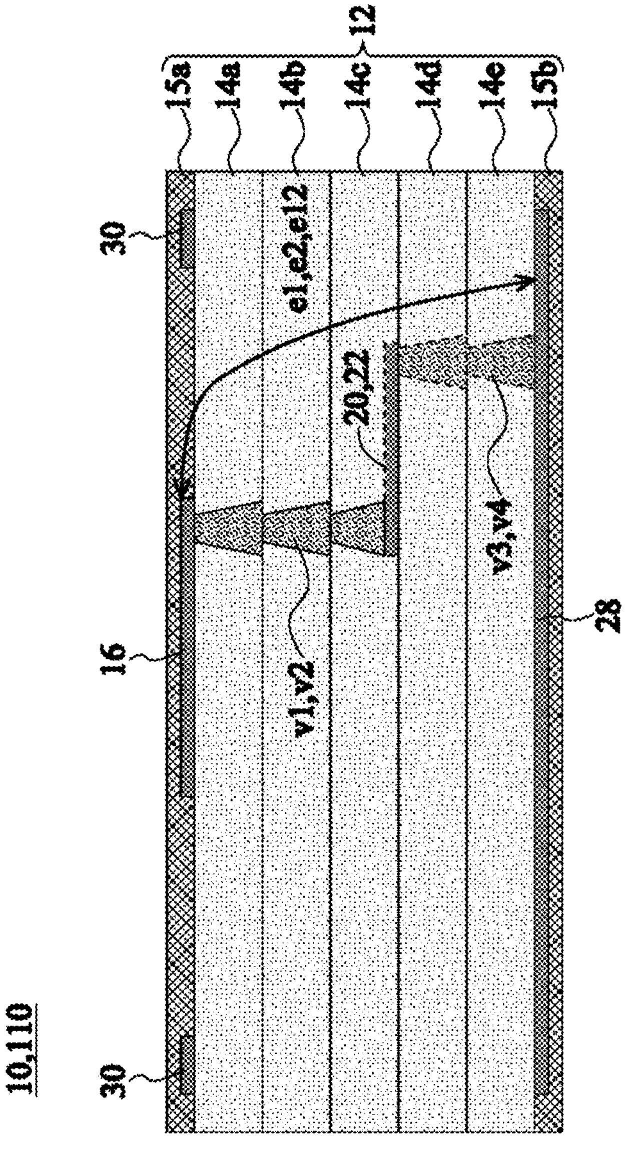
FIG. 4 is a cross-sectional view of the multilayer boards.
Figure 5:
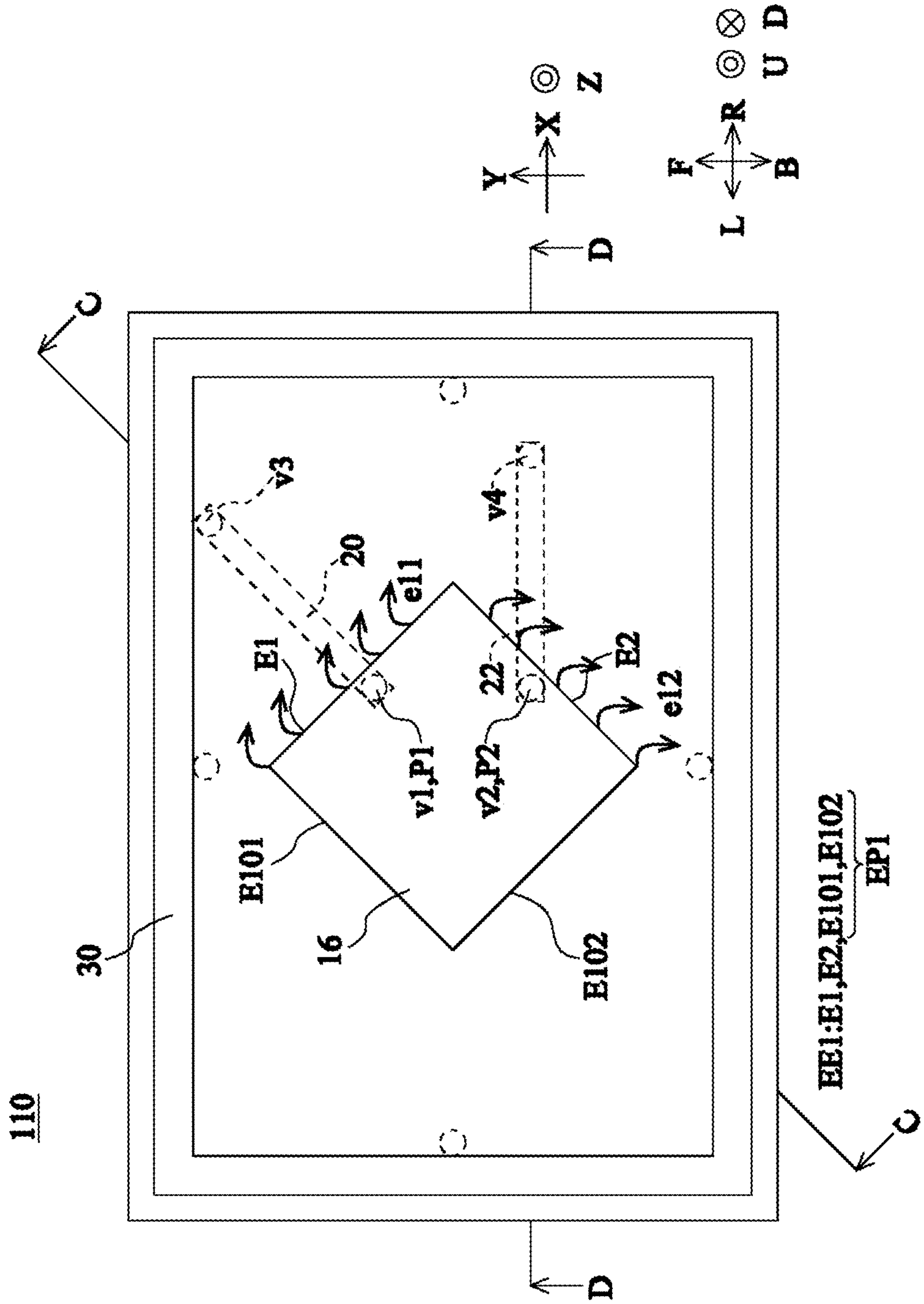
FIG. 5 is a top view of the multilayer board.
Figure 6:
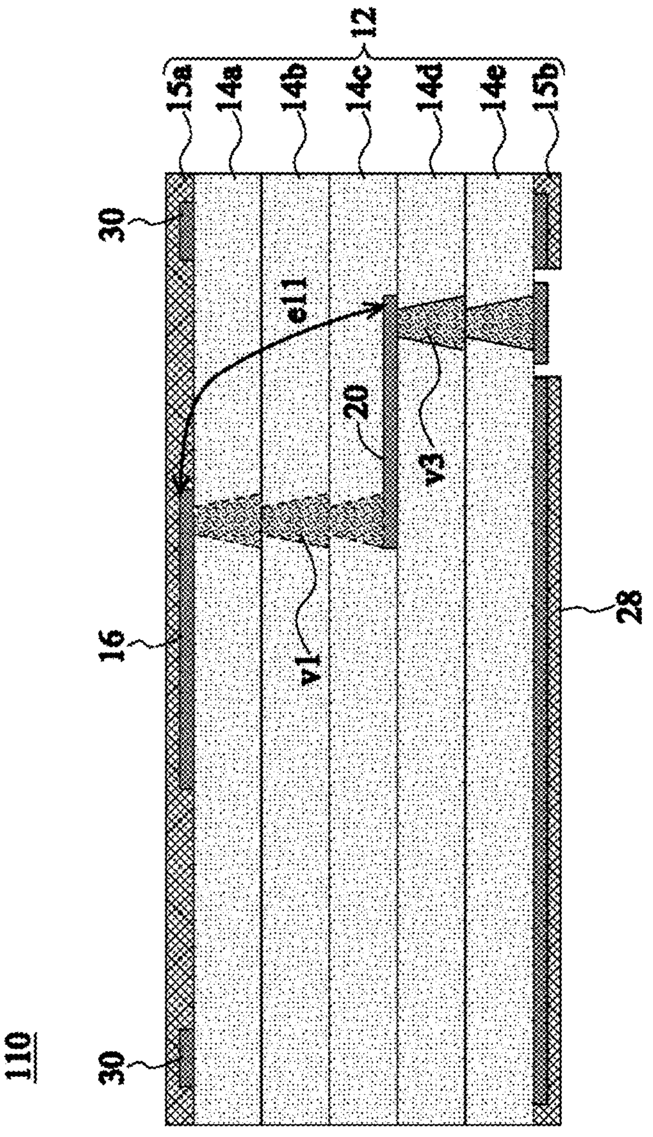
FIG. 6 is a cross-sectional view of the multilayer board.

According to the multilayer board 10, it is possible to decrease the difference between the radiation pattern of the first high-frequency signal and the radiation pattern of the second high-frequency signal and prevent tilt of the radiation direction of the first high-frequency signal and the radiation direction of the second high-frequency signal with respect to the normal direction of the principal surfaces of each radiation conductor layer. Hereinafter, a multilayer board 110 according to a comparative example will be described as an example. FIG. 4 is a cross-sectional view of the multilayer boards 10 and 110. FIG. 4 is a cross-sectional view along line B1-B1 in FIG. 2, line B2-B2 in FIG. 2, and line D-D in FIG. 5. FIG. 5 is a top view of the multilayer board 110. FIG. 6 is a cross-sectional view of the multilayer board 110. FIG. 6 is a cross-sectional view along line C-C in FIG. 5.

The multilayer board 110 illustrated in FIG. 5 is different from the multilayer board 10 in that the first wiring layer 20 is orthogonal to the first straight line E1. In the multilayer board 110, the first high-frequency signal is supplied to the first radiation conductor layer 16 through the first power supply point P1. Accordingly, a standing wave occurs at the first straight line E1 and the first high-frequency signal is radiated. In this case, an electric force line e11 occurs from the first straight line E1 to the ground conductor layer 28. The electric force line e11 extends in the direction orthogonal to the first straight line E1 and in the down direction.

Similarly, the second high-frequency signal is supplied to the first radiation conductor layer 16 through the second power supply point P2. Accordingly, a standing wave occurs at the second straight line E2 and the second high-frequency signal is radiated. In this case, an electric force line e12 occurs from the second straight line E2 to the ground conductor layer 28. The electric force line e12 extends in the direction orthogonal to the second straight line E2 and in the down direction.

The first wiring layer 20 is orthogonal to the first straight line E1. Thus, the first wiring layer 20 extends long in a direction orthogonal to the first straight line E1. Accordingly, the electric force line e11 is likely to be interrupted by the first wiring layer 20 as illustrated in FIG. 6. When the electric force line e11 is interrupted by the first wiring layer 20 in this manner, the radiation direction of the first high-frequency signal tilts to the upper-right direction with respect to the up-down direction.

Furthermore, the second wiring layer 22 is not orthogonal to the second straight line E2. Thus, the second wiring layer 22 does not extend long in a direction orthogonal to the second straight line E2. Accordingly, the electric force line e12 is unlikely to be interrupted by the second wiring layer 22 as illustrated in FIG. 4. When the electric force line e12 is unlikely to be interrupted by the second wiring layer 22 in this manner, the radiation direction of the second high-frequency signal is unlikely to tilt with respect to the up-down direction. As a result, in the multilayer board 110, difference occurs between the radiation pattern of the first high-frequency signal and the radiation pattern of the second high-frequency signal. Thus, in the multilayer board 10, the first wiring layer 20 intersects but is not orthogonal to the first straight line E1 in a view along the up-down direction (Z-axis direction). Moreover, the second wiring layer 22 intersects but is not orthogonal to the second straight line E2 in a view along the up-down direction (Z-axis direction). Accordingly, an electric force line e1 is unlikely to be interrupted by the first wiring layer 20 as illustrated in FIG. 4. Moreover, an electric force line e2 is unlikely to be interrupted by the second wiring layer 22 as illustrated in FIG. 4. As a result, the radiation direction of the first high-frequency signal and the radiation direction of the second high-frequency signal can be prevented from tilting with respect to the normal direction (up-down direction) of the principal surfaces of the first radiation conductor layer 16. Moreover, since the radiation direction of the first high-frequency signal and the radiation direction of the second high-frequency signal is prevented from tilting with respect to the up-down direction, the difference between the radiation pattern of the first high-frequency signal and the radiation pattern of the second high-frequency signal decreases. The radiation direction of a high-frequency signal in the present specification is the central axis line of the radiation pattern of the high-frequency signal.

In addition, in the multilayer board 10, the reception direction of the first high-frequency signal and the reception direction of the second high-frequency signal are prevented from tilting with respect to the up-down direction for the same reason as described above, and thus the difference between the reception pattern of the first high-frequency signal and the reception pattern of the second high-frequency signal decreases.

According to the multilayer board 10, for a reason described below as well, it is possible to decrease the difference between the radiation pattern of the first high-frequency signal and the radiation pattern of the second high-frequency signal and prevent tilt of the radiation direction of the first high-frequency signal and the radiation direction of the second high-frequency signal with respect to the normal direction of the principal surfaces of a radiation electrode. More specifically, the electric force line e1 is likely to occur in the first region A1. The electric force line e2 is likely to occur in the second region A2. Thus, in the multilayer board 10, the first wiring layer 20 is disposed in both the first region A1 and the region outside the first region A1 in a view along the up-down direction. Moreover, the second wiring layer 22 is disposed in both the second region A2 and the region outside the second region A2 in a view along the up-down direction. With this configuration, the length of a part of the first wiring layer 20 positioned in the first region A1 is short. The length of a part of the second wiring layer 22 positioned in the second region A2 is short. Accordingly, the electric force line e1 is unlikely to be interrupted by the first wiring layer 20. The electric force line e2 is unlikely to be interrupted by the second wiring layer 22. As a result, according to the multilayer board 10, it is possible to decrease the difference between the radiation pattern of the first high-frequency signal and the radiation pattern of the second high-frequency signal and prevent tilt of the radiation direction of the first high-frequency signal and the radiation direction of the second high-frequency signal with respect to the normal direction of the principal surfaces of a radiation electrode.

According to the multilayer board 10, the distance L1, the distance L2, the distance L3, and the distance L4 are equal to one another. Accordingly, the magnitude of capacitance generated between the first straight line E1 and the annular ground conductor layer 30, the magnitude of capacitance generated between the second straight line E2 and the annular ground conductor layer 30, the magnitude of capacitance generated between the straight line E101 and the annular ground conductor layer 30, and the magnitude of capacitance generated between the straight line E102 and the annular ground conductor layer 30 are close to one another. As a result, it is possible to decrease the difference between the radiation pattern of the first high-frequency signal and the radiation pattern of the second high-frequency signal and prevent tilt of the radiation direction of the first high-frequency signal and the radiation direction of the second high-frequency signal with respect to the normal direction of the principal surfaces of a radiation electrode.

First Modification

Figure 7:
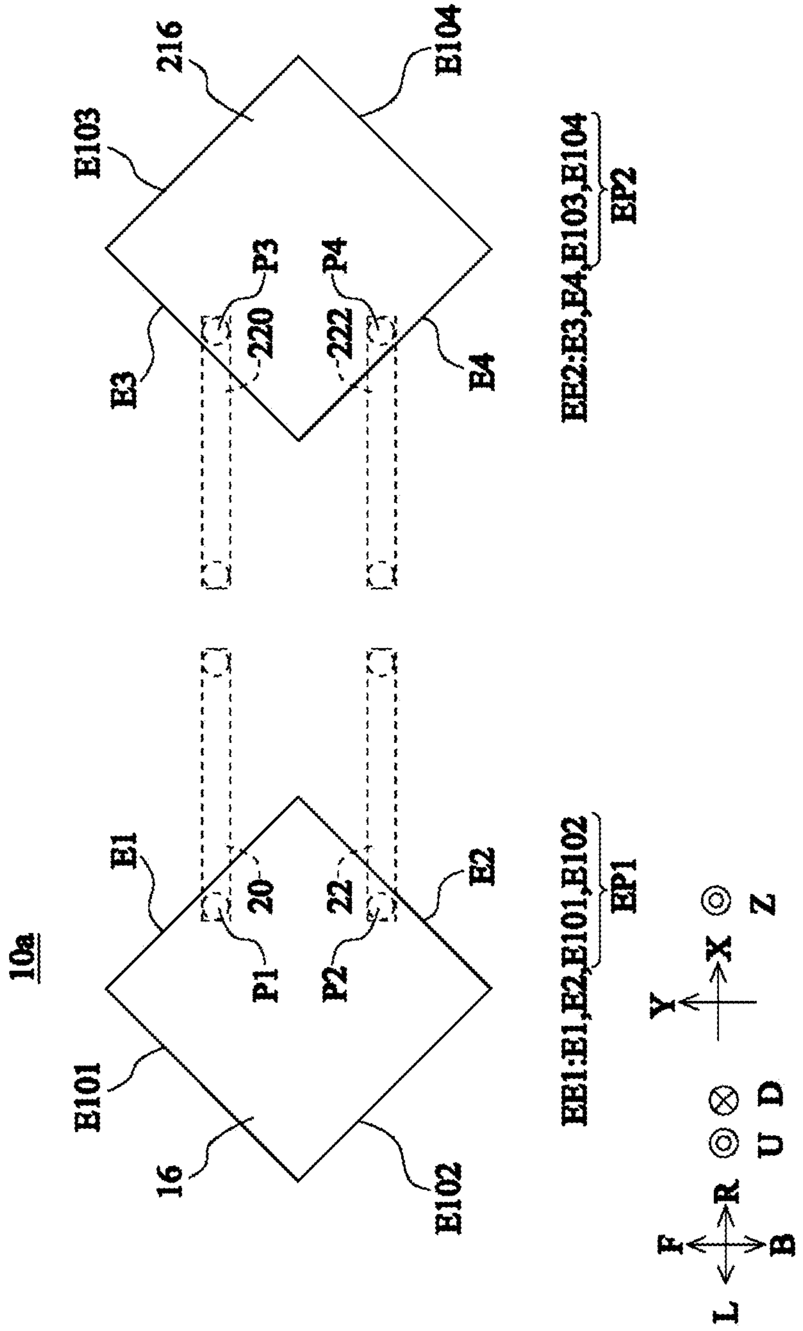
FIG. 7 is a top view of a multilayer board.

A multilayer board 10*a* according to a first modification will be described below. FIG. 7 is a top view of the multilayer board 10*a*.

The multilayer board 10*a* is different from the multilayer board 10 in that the multilayer board 10*a* further includes a second radiation conductor layer 216, a third wiring layer 220, and a fourth wiring layer 222.

The second radiation conductor layer 216, the third wiring layer 220, and the fourth wiring layer 222 have the same structures as the first radiation conductor layer 16, the first wiring layer 20, and the second wiring layer 22, respectively. Specifically, the second radiation conductor layer 216 is provided in the multilayer body 12. The second radiation conductor layer 216 has a second outer edge EE2 including a third straight line E3, a fourth straight line E4, a straight line E103, and a straight line E104 in a view along the up-down direction (Z-axis direction). The fourth straight line E4 intersects the third straight line E3 in a view along the up-down direction (Z-axis direction). The fourth straight line E4 is orthogonal to the third straight line E3 in a view along the up-down direction (Z-axis direction). The ground conductor layer 28 overlaps the second radiation conductor layer 216 in a view along the up-down direction (Z-axis direction).

The third wiring layer 220 is provided in the multilayer body 12. The third wiring layer 220 is positioned on the lower side of the second radiation conductor layer 216 (on the negative side thereof along the Z axis) and on the upper side of the ground conductor layer 28 (on the positive side thereof along the Z axis). The third wiring layer 220 is electrically connected to the second radiation conductor layer 216 at a third power supply point P3 positioned closest to the third straight line E3 in the second outer edge EE2. The third wiring layer 220 intersects but is not orthogonal to the third straight line E3 in a view along the up-down direction (Z-axis direction).

The fourth wiring layer 222 is provided in the multilayer body 12. The fourth wiring layer 222 is positioned on the lower side of the second radiation conductor layer 216 (on the negative side thereof along the Z axis) and on the upper side of the ground conductor layer 28 (on the positive side thereof along the Z axis). The fourth wiring layer 222 is electrically connected to the second radiation conductor layer 216 at a fourth power supply point P4 positioned closest to the fourth straight line E4 in the second outer edge EE2. The fourth wiring layer 222 intersects but is not orthogonal to the fourth straight line E4 in a view along the up-down direction (Z-axis direction).

The second radiation conductor layer 216 is positioned on the right side of the first radiation conductor layer 16 (on the positive side thereof along the X axis). The first straight line E1 and the second straight line E2 is positioned on the right side of the first part EP1 of the first outer edge EE1 except for the first straight line E1 and the second straight line E2 (on the positive side thereof along the X axis). The third straight line E3 and the fourth straight line E4 are positioned on the left side of a second part EP2 of the second outer edge EE2 except for the third straight line E3 and the fourth straight line E4 (on the negative side thereof along the X axis). The other structure of the multilayer board 10*a* is the same as that of the multilayer board 10 and thus description thereof is omitted. The multilayer board 10*a* can achieve the same effects as the multilayer board 10.

According to the multilayer board 10*a*, mutual coupling between the first radiation conductor layer 16 and the second radiation conductor layer 216 is prevented, and thus gain decrease of the first radiation conductor layer 16 and the second radiation conductor layer 216 is prevented. More specifically, in the first radiation conductor layer 16, electric field strength is high at the straight lines E101 and E102. In the second radiation conductor layer 216, electric field strength is high at the straight lines E103 and E104. Thus, the straight lines E101 and E102 are likely to have electric field coupling with the third wiring layer 220 and the fourth wiring layer 222. The straight lines E103 and E104 are likely to have electric field coupling with the first wiring layer 20 and the second wiring layer 22. Thus, in the multilayer board 10*a*, the first straight line E1 and the second straight line E2 are positioned on the right side of the first part EP1 of the first outer edge EE1 except for the first straight line E1 and the second straight line E2. The third straight line E3 and the fourth straight line E4 are positioned on the left side of the second part EP2 of the second outer edge EE2 except for the third straight line E3 and the fourth straight line E4. Accordingly, the straight lines E101 and E102 are positioned far from the third wiring layer 220 and the fourth wiring layer 222. The straight lines E103 and E104 are positioned far from the first wiring layer 20 and the second wiring layer 22. With this configuration, mutual coupling between the first radiation conductor layer 16 and the second radiation conductor layer 216 is prevented, and thus gain decrease of the first radiation conductor layer 16 and the second radiation conductor layer 216 is prevented.

Second Modification

Figure 8:
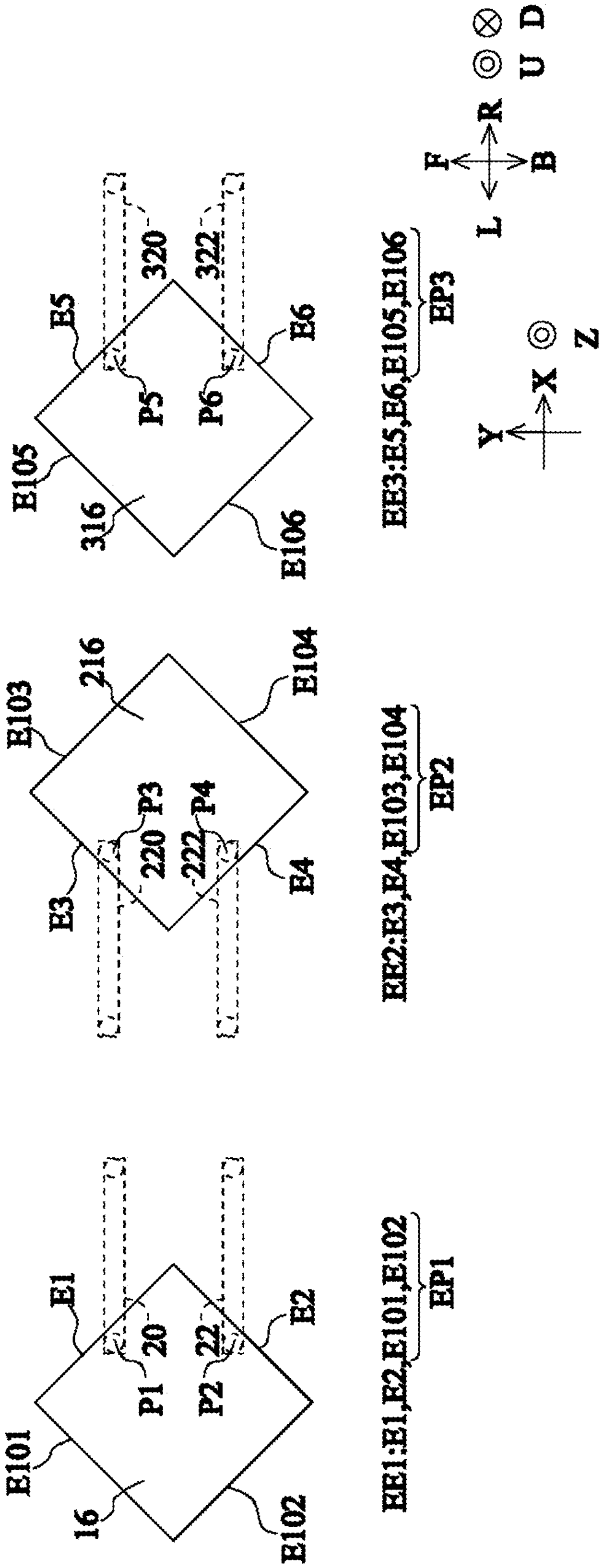
FIG. 8 is a top view of a multilayer board.

A multilayer board 10*b* according to a second modification will be described below. FIG. 8 is a top view of the multilayer board 10*b*.

The multilayer board 10*b* is different from the multilayer board 10*a* in that the multilayer board 10*b* further includes a third radiation conductor layer 316, a fifth wiring layer 320, and a sixth wiring layer 322.

The third radiation conductor layer 316 is provided in the multilayer body 12. The third radiation conductor layer 316 has a third outer edge EE3 including a fifth straight line E5, a sixth straight line E6, a straight line E105, and a straight line E106 in a view along the up-down direction (Z-axis direction). The sixth straight line E6 intersects the fifth straight line E5 in a view along the up-down direction (Z-axis direction). The sixth straight line E6 is orthogonal to the fifth straight line E5 in a view along the up-down direction (Z-axis direction). The ground conductor layer 28 overlaps the third radiation conductor layer 316 in a view along the up-down direction (Z-axis direction).

The fifth wiring layer 320 is provided in the multilayer body 12. The third wiring layer 220 is positioned on the lower side of the third radiation conductor layer 316 (on the negative side thereof along the Z axis) and on the upper side of the ground conductor layer 28 (on the positive side thereof along the Z axis). The fifth wiring layer 320 is electrically connected to the third radiation conductor layer 316 at a fifth power supply point P5 positioned closest to the fifth straight line E5 in the third outer edge EE3. The fifth wiring layer 320 intersects but is not orthogonal to the fifth straight line E5 in a view along the up-down direction (Z-axis direction).

The sixth wiring layer 322 is provided in the multilayer body 12. The sixth wiring layer 322 is positioned on the lower side of the third radiation conductor layer 316 (on the negative side thereof along the Z axis) and on the upper side of the ground conductor layer 28 (on the positive side thereof along the Z axis). The sixth wiring layer 322 is electrically connected to the third radiation conductor layer 316 at a sixth power supply point P6 positioned closest to the sixth straight line E6 in the third outer edge EE3. The sixth wiring layer 322 intersects but is not orthogonal to the sixth straight line E6 in a view along the up-down direction (Z-axis direction).

The third radiation conductor layer 316 is positioned on the right side of the second radiation conductor layer 216 (on the positive side thereof along the X axis). The fifth straight line E5 and the sixth straight line E6 are positioned on the right side of a third part EP3 of the third outer edge EE3 except for the fifth straight line E5 and the sixth straight line E6 (on the positive side thereof along the X axis). The other structure of the multilayer board 10*b* is the same as that of the multilayer board 10*a* and thus description thereof is omitted. The multilayer board 10*b* can achieve the same effects as the multilayer board 10*a*.

Moreover, according to the multilayer board 10*b*, the third wiring layer 220 and the fourth wiring layer 222 are separated from the fifth wiring layer 320 and the sixth wiring layer 322. As a result, coupling between the second radiation conductor layer 216 and the third radiation conductor layer 316 is prevented.

Third Modification

Figure 9:
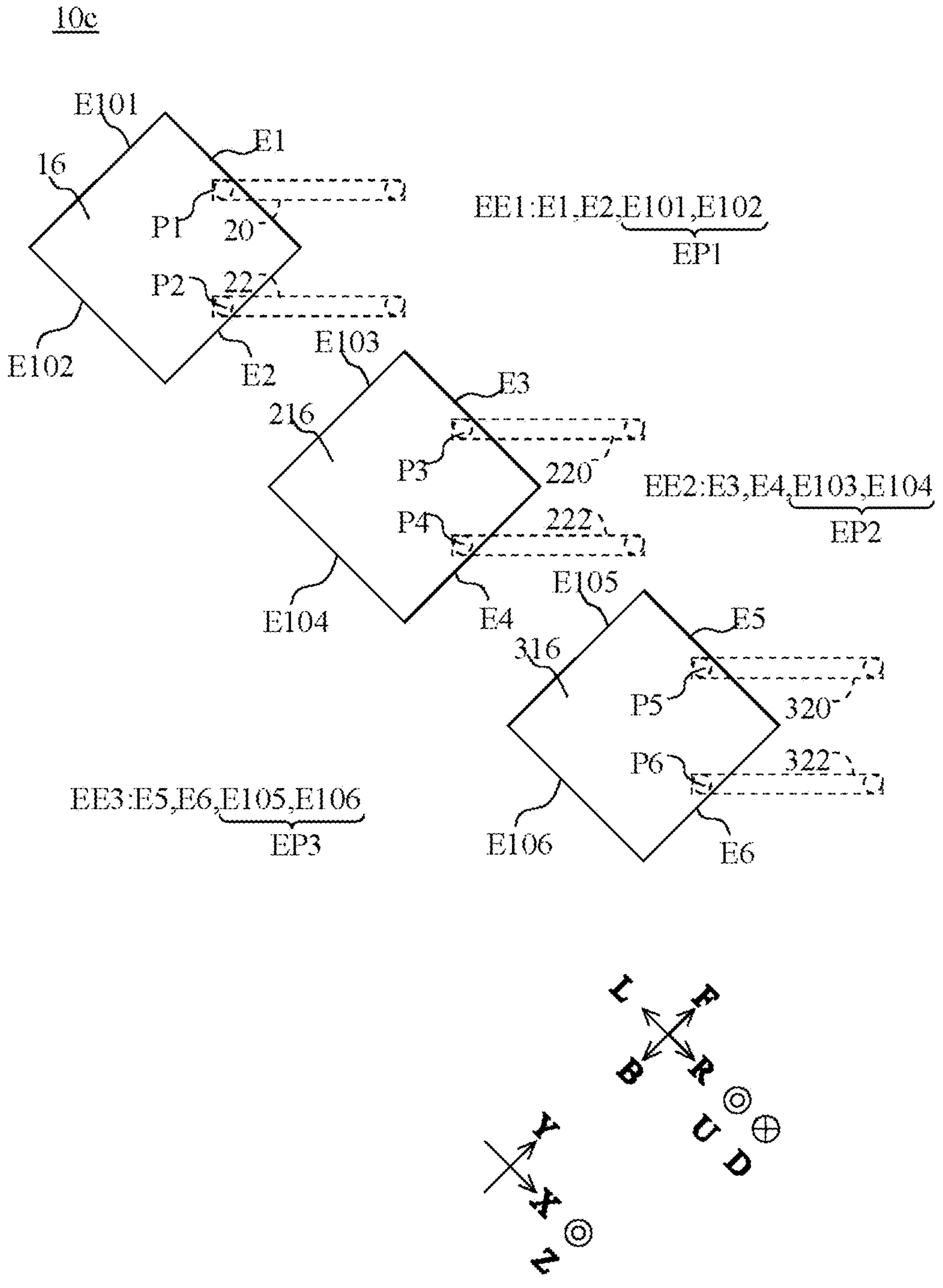
FIG. 9 is a top view of a multilayer board.

A multilayer board 10*c* according to a third modification will be described below. FIG. 9 is a top view of the multilayer board 10*c*.

The multilayer board 10*c* is different from the multilayer board 10*b* in the positions of the first radiation conductor layer 16, the second radiation conductor layer 216, and the third radiation conductor layer 316. More specifically, the second radiation conductor layer 216 is positioned on the right side of the first radiation conductor layer 16 (on the positive side thereof along the X axis). The third radiation conductor layer 316 is positioned on the right side of the second radiation conductor layer 216 (on the positive side thereof along the X axis). The first straight line E1, the third straight line E3, and the fifth straight line E5 are parallel to the right-left direction (X axis). The second straight line E2, the fourth straight line E4, and the sixth straight line E6 overlap one another in a view along the right-left direction (X-axis direction). The right end of the first straight line E1 (its end on the positive side along the X axis) is connected to the front end of the second straight line E2 (its end on the positive side along the Y axis). The right end of the third straight line E3 (its end on the positive side along the X axis) is connected to the front end of the fourth straight line E4 (its end on the positive side along the Y axis). The right end of the fifth straight line E5 (its end on the positive side along the X axis) is connected to the front end of the sixth straight line E6 (its end on the positive side along the Y axis). The other structure of the multilayer board 10*c* is the same as that of the multilayer board 10*b* and thus description thereof is omitted.

According to the multilayer board 10*c*, the degree of coupling between the first radiation conductor layer 16 and the second radiation conductor layer 216 and the degree of coupling between the second radiation conductor layer 216 and the third radiation conductor layer 316 can be made close to each other. More specifically, in the first radiation conductor layer 16, electric field strength is high at the straight lines E101 and E102. In the second radiation conductor layer 216, electric field strength is high at the straight lines E103 and E104. In the third radiation conductor layer 316, electric field strength is high at the straight lines E105 and E106. The second straight line E2 and the straight line E103 face each other. The fourth straight line E4 and the straight line E105 face each other. Accordingly, the degree of coupling between the first radiation conductor layer 16 and the second radiation conductor layer 216 and the degree of coupling between the second radiation conductor layer 216 and the third radiation conductor layer 316 can be made close to each other. As a result, a high-frequency signal radiated from the first radiation conductor layer 16, the second radiation conductor layer 216, and the third radiation conductor layer 316 as a whole can be prevented from tilting with respect to the normal direction of the principal surfaces of each radiation conductor layer.

Fourth Modification

Figure 10:
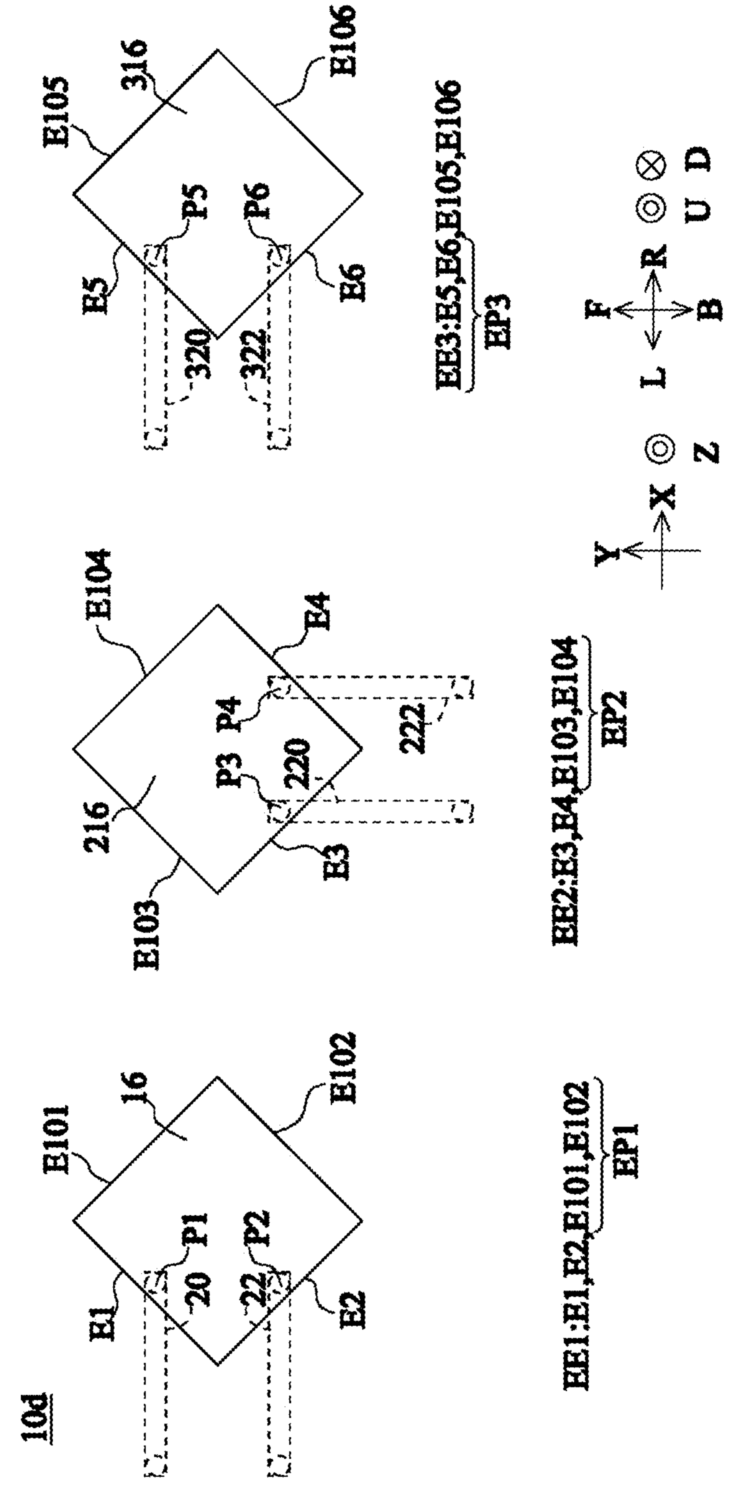
FIG. 10 is a top view of a multilayer board.

A multilayer board 10*d* according to a fourth modification will be described below. FIG. 10 is a top view of the multilayer board 10*d*.

The multilayer board 10*d* is different from the multilayer board 10*b* in the positions of the first radiation conductor layer 16, the second radiation conductor layer 216, and the third radiation conductor layer 316. More specifically, the second radiation conductor layer 216 is positioned on the right side of the first radiation conductor layer 16 (on the positive side thereof along the X axis). The third radiation conductor layer 316 is positioned on the right side of the second radiation conductor layer 216 (on the positive side thereof along the X axis).

The first straight line E1 and the second straight line E2 is positioned on the left side of the first part EP1 of the first outer edge EE1 except for the first straight line E1 and the second straight line E2 (on the negative side thereof along the X axis). The third straight line E3 and the fourth straight line E4 are positioned on the back side of the second part EP2 of the second outer edge EE2 except for the third straight line E3 and the fourth straight line E4 (on the negative side thereof along the Y axis). The fifth straight line E5 and the sixth straight line E6 are positioned on the left side of the third part EP3 of the third outer edge EE3 except for the fifth straight line E5 and the sixth straight line E6 (on the negative side thereof along the X axis). The other structure of the multilayer board 10*d* is the same as that of the multilayer board 10*b* and thus description thereof is omitted.

Fifth Modification

Figure 11:
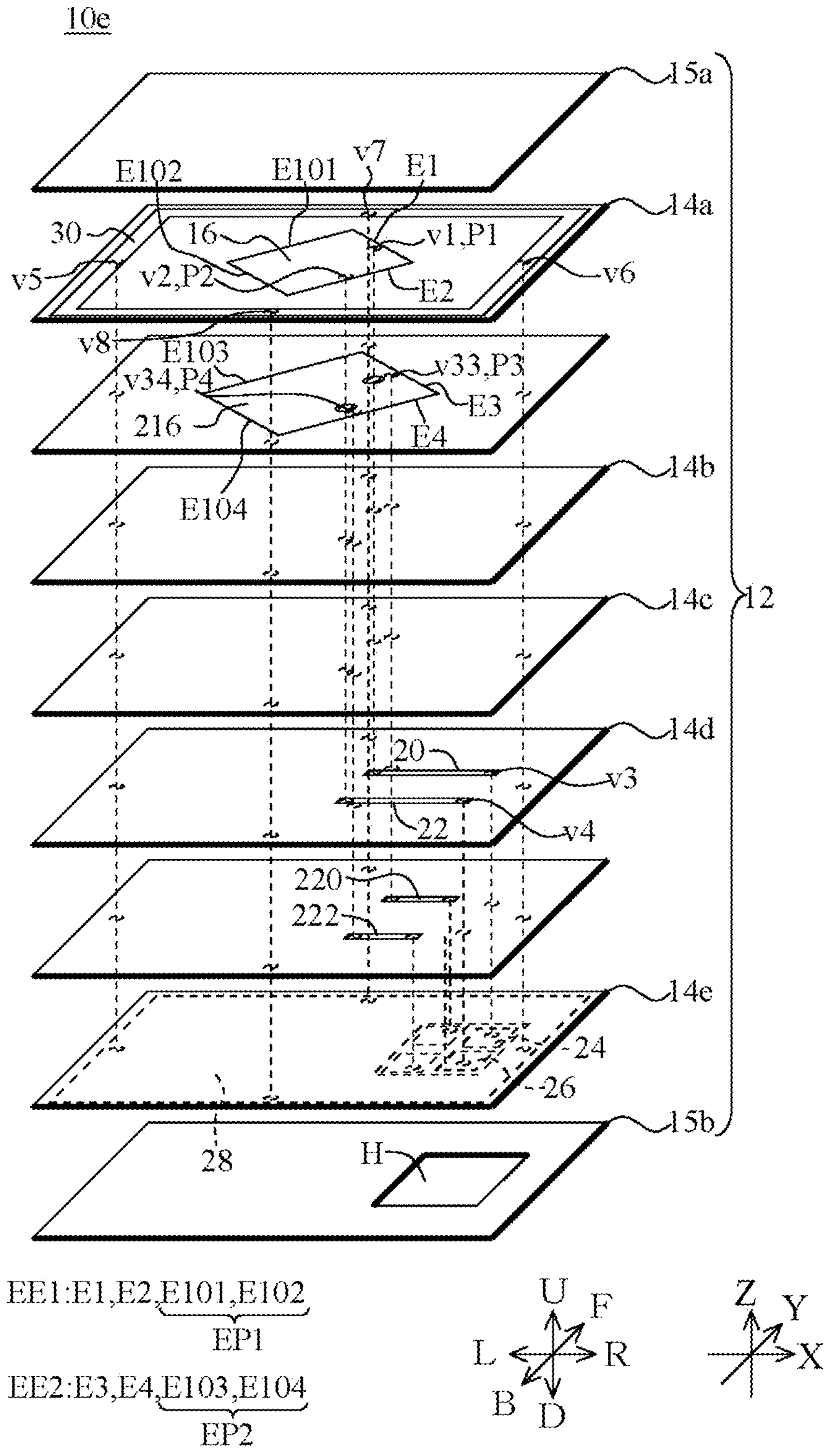
FIG. 11 is an exploded perspective view of a multilayer board.
Figure 12:
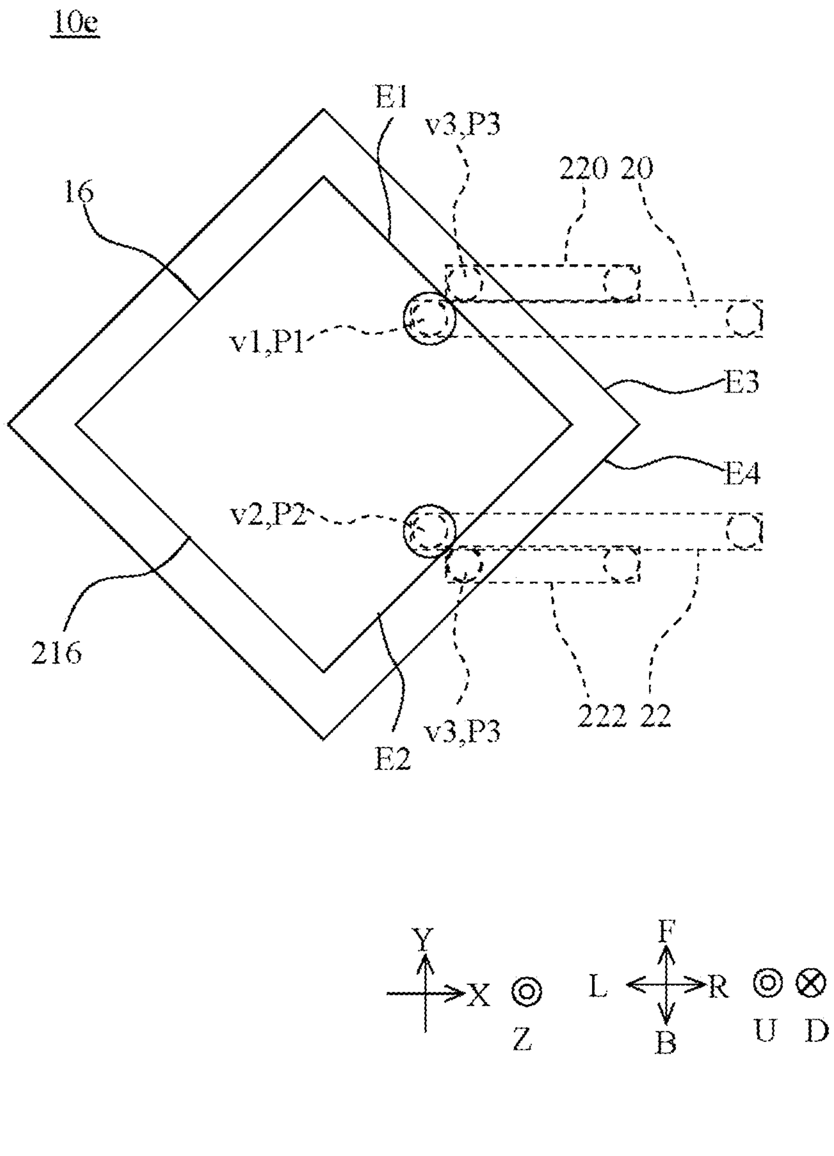
FIG. 12 is a top view of the multilayer board.

A multilayer board 10*e* according to a fifth modification will be described below. FIG. 11 is an exploded perspective view of the multilayer board 10*e*. FIG. 12 is a top view of the multilayer board 10*e*.

The multilayer board 10*e* is different from the multilayer board 10 in that the multilayer board 10*e* further includes the second radiation conductor layer 216, the third wiring layer 220 and the fourth wiring layer 222. The second radiation conductor layer 216 is provided in the multilayer body 12. The second radiation conductor layer 216 is positioned on the lower side of the first radiation conductor layer 16 (on the negative side thereof along the Z axis). The second radiation conductor layer 216 overlaps the first radiation conductor layer 16 in a view along the up-down direction (Z-axis direction). The second radiation conductor layer 216 has the second outer edge EE2 including the third straight line E3 and the fourth straight line E4 in a view along the up-down direction (Z-axis direction).

The right end of the third straight line E3 (its end on the positive side along the X axis) is connected to the right end of the fourth straight line E4 (its end on the positive side along the X axis). The third straight line E3 is parallel to the first straight line E1. The fourth straight line E4 is parallel to the second straight line E2.

The third wiring layer 220 is provided in the multilayer body 12. The third wiring layer 220 is positioned on the lower side of the second radiation conductor layer 216 (on the negative side thereof along the Z axis) and on the upper side of the ground conductor layer 28 (on the positive side thereof along the Z axis). The third wiring layer 220 is electrically connected to the second radiation conductor layer 216 at the third power supply point P3 positioned closest to the third straight line E3 in the second outer edge EE2. The third wiring layer 220 intersects but is not orthogonal to the third straight line E3 in a view along the up-down direction (Z-axis direction).

The fourth wiring layer 222 is provided in the multilayer body 12. The fourth wiring layer 222 is positioned on the lower side of the second radiation conductor layer 216 (on the negative side thereof along the Z axis) and on the upper side of the ground conductor layer 28 (on the positive side thereof along the Z axis). The fourth wiring layer 222 is electrically connected to the second radiation conductor layer 216 at the fourth power supply point P4 positioned closest to the fourth straight line E4 in the second outer edge EE2. The fourth wiring layer 222 intersects but is not orthogonal to the fourth straight line E4 in a view along the up-down direction (Z-axis direction).

The first wiring layer 20 intersects but is not orthogonal to the first straight line E1 and the third straight line E3 in a view along the up-down direction (Z-axis direction). The second wiring layer 22 intersects but is not orthogonal to the second straight line E2 and the fourth straight line E4 in a view along the up-down direction (Z-axis direction). The other structure of the multilayer board 10*e* is the same as that of the multilayer board 10 and thus description thereof is omitted. The multilayer board 10*e* can achieve the same effects as the multilayer board 10.

According to the multilayer board 10*e*, mutual coupling between the first radiation conductor layer 16 and the second radiation conductor layer 216 is prevented, and thus gain decrease of the first radiation conductor layer 16 and the second radiation conductor layer 216 is prevented. More specifically, in the first radiation conductor layer 16, electric field strength is high at the straight lines E101 and E102. In the second radiation conductor layer 216, electric field strength is high at the straight lines E103 and E104. Thus, the straight lines E101 and E102 are likely to have electric field coupling with the third wiring layer 220 and the fourth wiring layer 222. The straight lines E103 and E104 are likely to have electric field coupling with the first wiring layer 20 and the second wiring layer 22.

In the multilayer board 10*e*, the first straight line E1 is parallel to the third straight line E3. The second straight line E2 is parallel to the fourth straight line E4. The right end of the first straight line E1 is connected to the right end of the second straight line E2. The right end of the third straight line E3 is connected to the right end of the fourth straight line E4. Accordingly, the first wiring layer 20 and the second wiring layer 22 are not positioned near the straight lines E103 and E104. The third wiring layer 220 and the fourth wiring layer 222 are not positioned near the straight lines E101 and E102. Accordingly, mutual coupling between the first radiation conductor layer 16 and the second radiation conductor layer 216 is prevented, and thus gain decrease of the first radiation conductor layer 16 and the second radiation conductor layer 216 is prevented.

The first wiring layer 20 and the second wiring layer 22 of the second radiation conductor layer 216 are extended away from the straight lines E101 and E102 at which the strength of an electric field generated by the first radiation conductor layer 16 is high. Accordingly, coupling between the first radiation conductor layer 16 and the second radiation conductor layer 216 is prevented, and gain decrease of the first radiation conductor layer 16 and the second radiation conductor layer 216 is reduced.

Sixth Modification

Figure 13:
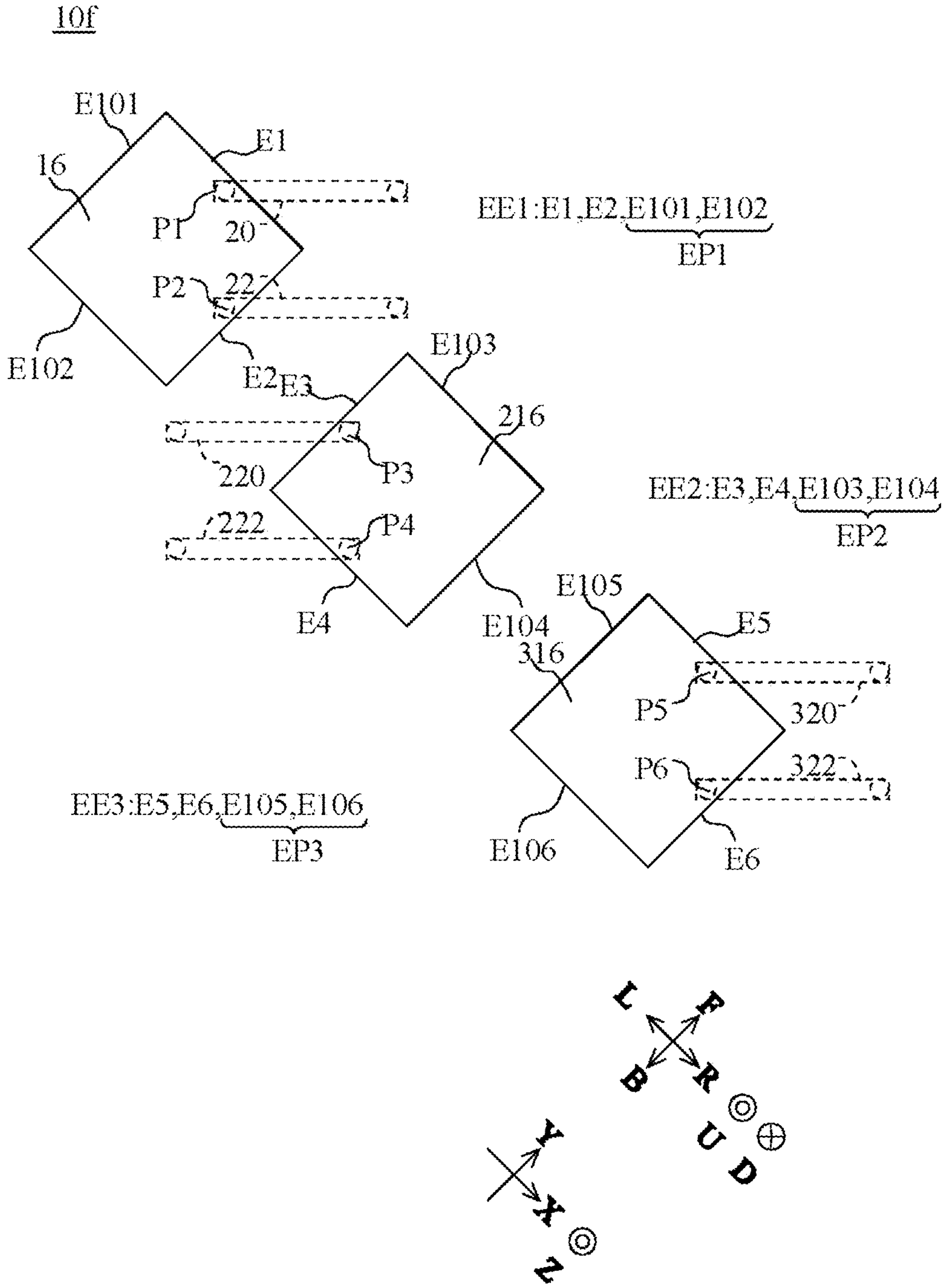
FIG. 13 is a top view of a multilayer board.

A multilayer board 10*f* according to a sixth modification will be described below. FIG. 13 is a top view of the multilayer board 10*f*.

The multilayer board 10*f* is different from the multilayer board 10*c* in disposition of the second radiation conductor layer 216. More specifically, the back end of the third straight line E3 (its end on the negative side along the Y axis) is connected to the left end of the fourth straight line E4 (its end on the negative side along the X axis). The other structure of the multilayer board 10*f* is the same as that of the multilayer board 10*c* and thus description thereof is omitted.

Seventh Modification

Figure 14:
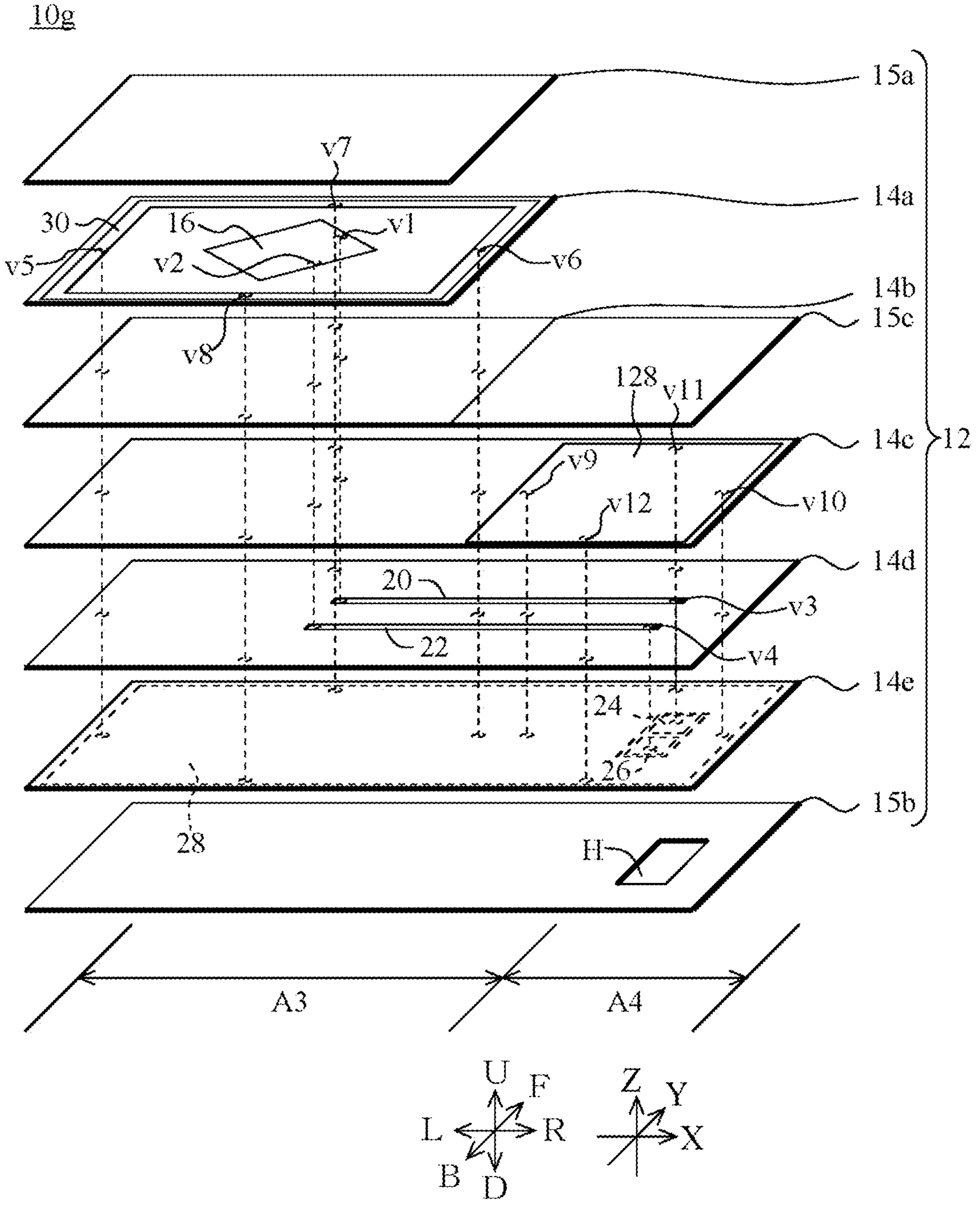
FIG. 14 is an exploded perspective view of a multilayer board.
Figure 15:
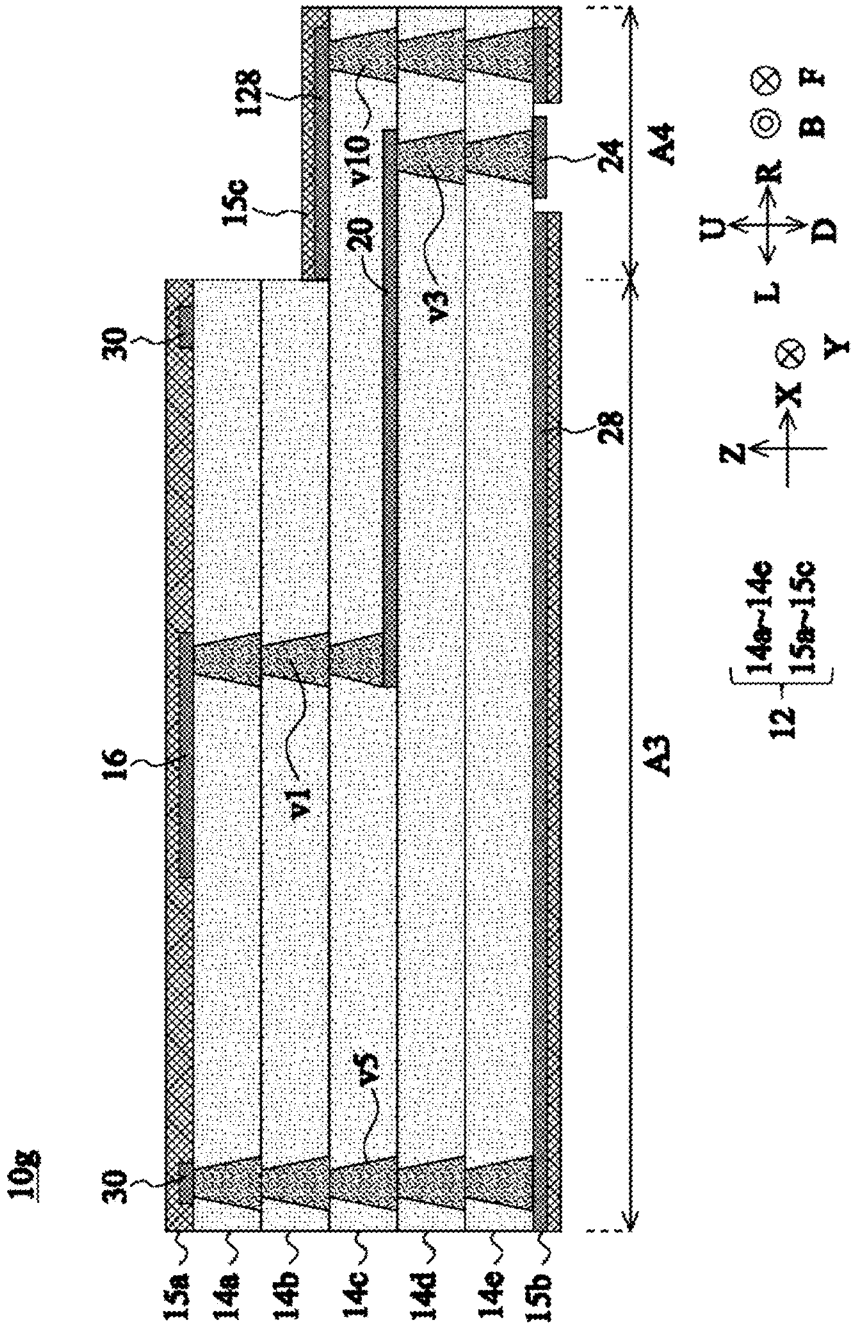
FIG. 15 is a cross-sectional view of the multilayer board.

A multilayer board 10*g* according to a seventh modification will be described below. FIG. 14 is an exploded perspective view of the multilayer board 10*g*. FIG. 15 is a cross-sectional view of the multilayer board 10*g*.

The multilayer board 10*g* is different from the multilayer board 10 in that the multilayer board 10*g* includes a rigid portion A3 and a flexible portion A4 and further includes a first ground conductor layer 128 and interlayer connection conductors v9 to v12.

The rigid portion A3 is a part the length of which in the up-down direction (Z-axis direction) is longer than the length of the flexible portion A4 in the up-down direction (Z-axis direction) as illustrated in FIGS. 14 and 15. In the present modification, the rigid portion A3 overlaps the protective layer 15*a* in a view along the up-down direction (Z-axis direction). The flexible portion A4 is a part the length of which in the up-down direction (Z-axis direction) is shorter than the length of the rigid portion A3 in the up-down direction (Z-axis direction). In the present modification, the flexible portion A4 is positioned on the right side of the rigid portion A3. The first wiring layer 20 is disposed in both the rigid portion A3 and the flexible portion A4. The second wiring layer 22 is disposed in both the rigid portion A3 and the flexible portion A4. The ground conductor layer 28 is disposed in both the rigid portion A3 and the flexible portion A4. In the rigid portion A3, no ground conductor is provided between the annular ground conductor layer 30 and the ground conductor layer 28. The outer electrodes 24 and 26 and the opening H are provided in the flexible portion A4. The other structure of the rigid portion A3 is the same as that of the multilayer board 10 and thus description thereof is omitted. The structure of the flexible portion A4 will be described below in detail.

In the flexible portion A4, the multilayer body 12 has a structure in which the insulator layers 14*c* to 14*e* and protective layers 15*b* and 15*c* are laminated in the up-down direction (Z-axis direction). The protective layer 15*c*, the insulator layers 14*c* to 14*e*, and the protective layer 15*b* are arranged in the stated order from top.

The first ground conductor layer 128 is provided on the upper principal surface of the insulator layer 14*c*. The first ground conductor layer 128 has a rectangular shape in a view along the up-down direction. The long sides of the first ground conductor layer 128 extend in the right-left direction. The short sides of the first ground conductor layer 128 extend in the front-back direction. The first ground conductor layer 128 overlaps the first wiring layer 20 and the second wiring layer 22 in a view along the up-down direction. The first ground conductor layer 128 is connected to the ground potential.

The interlayer connection conductors v9 to v12 electrically connect the first ground conductor layer 128 and the ground conductor layer 28. More specifically, the interlayer connection conductors v9 to v12 penetrate through the insulator layers 14*c* to 14*e* in the up-down direction. The upper end of the interlayer connection conductors v9 to v12 contacts the first ground conductor layer 128. The lower end of the interlayer connection conductors v9 to v12 contacts the ground conductor layer 28.

The first ground conductor layer 128 is formed by patterning metal foil attached to the upper principal surface of the insulator layer 14*c*. The metal foil is, for example, copper foil. The interlayer connection conductors v9 to v12 are formed by filling, with the conductive paste, through-holes penetrating through the insulator layers 14*c* to 14*e* in the up-down direction and solidifying the conductive paste through heating and pressurization.

The protective layer 15*c* has a dielectric constant larger than the dielectric constants of the insulator layers 14*a* to

14*e*. In the flexible portion A4, the protective layer 15*c* covers the upper principal surface of the insulator layer 14*c*. Accordingly, the protective layer 15*c* protects the first ground conductor layer 128.

The structures of the outer electrodes 24 and 26 and the opening H are the same as in the multilayer board 10 and thus description thereof is omitted. The other structure of the multilayer board 10*g* is the same as that of the multilayer board 10 and thus description thereof is omitted.

The multilayer board 10*g* can achieve the same effects as the multilayer board 10.

(a) According to the multilayer board 10*g*, bending fabrication of the multilayer board 10*g* is easy. More specifically, the multilayer board 10*g* includes the rigid portion A3 and the flexible portion A4. The length of the flexible portion A4 in the up-down direction (Z-axis direction) is shorter than the length of the rigid portion A3 in the up-down direction (Z-axis direction). Thus, the flexible portion A4 is more easily deformable than the rigid portion A3. In other words, the flexible portion A4 is easily bendable. Accordingly, the multilayer board 10*g* can be easily bend. As a result, bending fabrication of the multilayer board 10*g* is easy.

(b) According to the multilayer board 10*g*, the length of the rigid portion A3 in the up-down direction (Z-axis direction) can be shortened. More specifically, in the rigid portion A3, the first wiring layer 20, and the second wiring layer 22 are positioned on the lower side of the annular ground conductor layer 30 and on the upper side of the ground conductor layer 28. Thus, noise is prevented from entering into the first wiring layer 20 and the second wiring layer 22 by the annular ground conductor layer 30 and the ground conductor layer 28.

(c) According to the multilayer board 10*g*, capacitance can be prevented from being generated between the first radiation conductor layer 16 and a ground conductor unlike a configuration in which the ground conductor is provided between the annular ground conductor layer 30 and the ground conductor layer 28.

Eighth Modification

Figure 16:
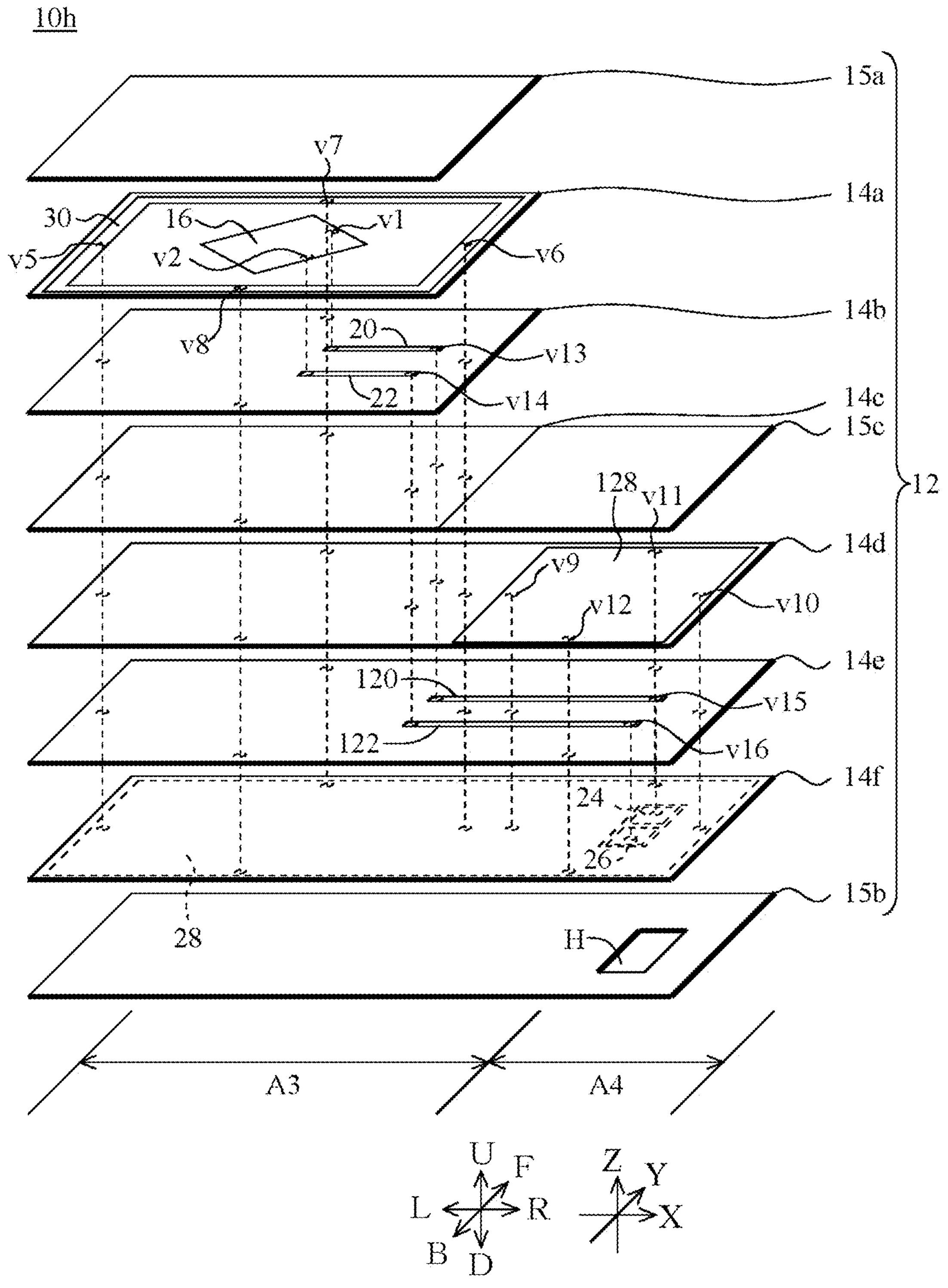
FIG. 16 is an exploded perspective view of a multilayer board.
Figure 17:
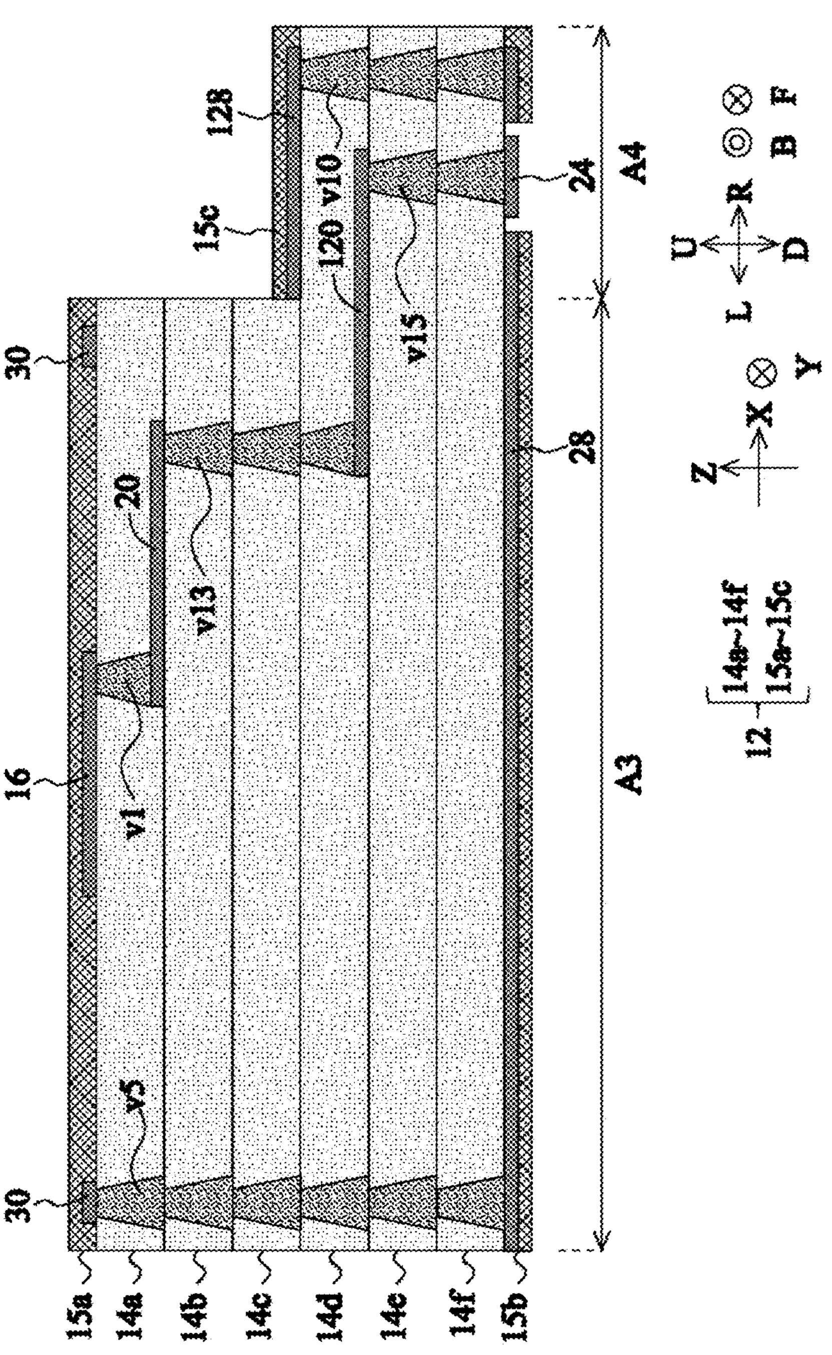
FIG. 17 is a cross-sectional view of the multilayer board.

A multilayer board 10*h* according to an eighth modification will be described below. FIG. 16 is an exploded perspective view of the multilayer board 10*h*. FIG. 17 is a cross-sectional view of the multilayer board 10*h*.

The multilayer board 10*h* is different from the multilayer board 10 in that the multilayer board 10*h* includes the rigid portion A3 and the flexible portion A4, further includes a seventh wiring layer 120, an eighth wiring layer 122, the first ground conductor layer 128, and interlayer connection conductors v9 to v12, v15, and v16, includes an interlayer connection conductor v13, and includes an interlayer connection conductor v14.

The rigid portion A3 is a part the length of which in the up-down direction (Z-axis direction) is longer than the length of the flexible portion A4 in the up-down direction (Z-axis direction) as illustrated in FIGS. 16 and 17. In the present modification, the rigid portion A3 overlaps the protective layer 15*a* in a view along the up-down direction (Z-axis direction). The flexible portion A4 is a part the length of which in the up-down direction (Z-axis direction) is shorter than the length of the rigid portion A3 in the up-down direction (Z-axis direction). In the present modification, the flexible portion A4 is positioned on the right side of the rigid portion A3. The structure of the rigid portion A3 will be first described below in detail. Then, the structure of the flexible portion A4 will be described below in detail.

In the rigid portion A3, the multilayer body 12 has a structure in which insulator layers 14*a* to 14*f* and the protective layers 15*a* and 15*b* are laminated in the up-down direction (Z-axis direction). The protective layer 15*a*, the insulator layers 14*a* to 14*f*, and the protective layer 15*b* are arranged in the stated order from top. The material of the insulator layer 14*f* is thermoplastic resin such as polyimide or liquid crystal polymer. The multilayer body 12 is flexible.

In the present modification, the first wiring layer 20 and the second wiring layer 22 are positioned on the upper principal surface of the insulator layer 14*b*. The interlayer connection conductors v1 and v2 penetrate through the insulator layer 14*a* in the up-down direction. The ground conductor layer 28 is provided on the lower principal surface of the insulator layer 14*f*. The protective layer 15*b* covers the lower principal surface of the insulator layer 14*f*. Accordingly, the protective layer 15*b* protects the ground conductor layer 28.

The seventh wiring layer 120 is provided in the multilayer body 12. The seventh wiring layer 120 is positioned on the lower side of the first wiring layer 20 (on the negative side thereof along the Z axis) and on the upper side of the ground conductor layer 28 (on the positive side thereof along the Z axis). In the present modification, the seventh wiring layer 120 is positioned on the upper principal surface of the insulator layer 14*e*. The seventh wiring layer 120 has a linear shape extending in the right-left direction in a view along the up-down direction. The seventh wiring layer 120 is disposed in both the rigid portion A3 and the flexible portion A4. The seventh wiring layer 120 does not overlap the first radiation conductor layer 16 in a view along the up-down direction.

The eighth wiring layer 122 is provided in the multilayer body 12. The eighth wiring layer 122 is positioned on the lower side of the second wiring layer 22 (on the negative side thereof along the Z axis) and on the upper side of the ground conductor layer 28 (on the positive side thereof along the Z axis). In the present modification, the eighth wiring layer 122 is positioned on the upper principal surface of the insulator layer 14*e*. The eighth wiring layer 122 is positioned on the back side of the seventh wiring layer 120 in a view along the up-down direction. The eighth wiring layer 122 has a linear shape extending in the right-left direction in a view along the up-down direction. The eighth wiring layer 122 is disposed in both the rigid portion A3 and the flexible portion A4. The eighth wiring layer 122 does not overlap the first radiation conductor layer 16 in a view along the up-down direction.

The interlayer connection conductor v13 electrically connects the first wiring layer 20 and the seventh wiring layer 120. More specifically, the interlayer connection conductor v13 penetrates through the insulator layers 14*b* to 14*d* in the up-down direction. The upper end of the interlayer connection conductor v13 contacts the right end portion of the first wiring layer 20. The lower end of the interlayer connection conductor v13 contacts a left end portion of the seventh wiring layer 120. Accordingly, the seventh wiring layer 120 is electrically connected to the first wiring layer 20.

The interlayer connection conductor v14 electrically connects the second wiring layer 22 and the eighth wiring layer 122. More specifically, the interlayer connection conductor v14 penetrates through the insulator layers 14*b* to 14*d* in the up-down direction. The upper end of the interlayer connection conductor v14 contacts the right end portion of the second wiring layer 22. The lower end of the interlayer connection conductor v14 contacts a left end portion of the eighth wiring layer 122. Accordingly, the eighth wiring layer 122 is electrically connected to the second wiring layer 22.

The interlayer connection conductors v13 and v14 are formed by filling, with conductive paste, through-holes penetrating through the insulator layers 14*b* to 14*d* in the up-down direction and solidifying the conductive paste through heating and pressurization.

The ground conductor layer 28 is disposed in both the rigid portion A3 and the flexible portion A4. The outer electrodes 24 and 26 and the opening H are provided in the flexible portion A4. The other structure of the rigid portion A3 is the same as that of the multilayer board 10 and thus description thereof is omitted. The structure of the flexible portion A4 will be described below in detail.

In the flexible portion A4, the multilayer body 12 has a structure in which the insulator layers 14*d* to 14*f* and the protective layers 15*b* and 15*c* are laminated in the up-down direction (Z-axis direction). The protective layer 15*c*, the insulator layers 14*d* to 14*f*, and the protective layer 15*b* are arranged in the stated order from top.

In the flexible portion A4, the first ground conductor layer 128 is provided on the upper principal surface of the insulator layer 14*d*. The first ground conductor layer 128 overlaps the seventh wiring layer 120 and the eighth wiring layer 122 in a view along the up-down direction. The other structure of the first ground conductor layer 128 is the same as that of the multilayer board 10*g* and thus description thereof is omitted.

In the flexible portion A4, the interlayer connection conductors v9 to v12 penetrate through the insulator layers 14*d* to 14*f* in the up-down direction. The other structures of the interlayer connection conductors v9 to v12 are the same as in the multilayer board 10*g* and thus description thereof is omitted.

The interlayer connection conductor v15 electrically connects the seventh wiring layer 120 and the outer electrode 24. More specifically, the interlayer connection conductor v15 penetrates through the insulator layers 14*e* and 14*f* in the up-down direction. The upper end of the interlayer connection conductor v15 contacts a right end portion of the seventh wiring layer 120. The lower end of the interlayer connection conductor v15 contacts the outer electrode 24.

The interlayer connection conductor v16 electrically connects the eighth wiring layer 122 and the outer electrode 26. More specifically, the interlayer connection conductor v16 penetrates through the insulator layers 14*e* and 14*f* in the up-down direction. The upper end of the interlayer connection conductor v16 contacts a right end portion of the eighth wiring layer 122. The lower end of the interlayer connection conductor v16 contacts the outer electrode 26.

The interlayer connection conductors v15 and v16 are formed by filling, with conductive paste, through-holes penetrating through the insulator layers 14*e* and 14*f* in the up-down direction and solidifying the conductive paste through heating and pressurization.

The protective layer 15*c* has a dielectric constant larger than the dielectric constants of the insulator layers 14*a* to 14*e*. In the flexible portion A4, the protective layer 15*c* covers the upper principal surface of the insulator layer 14*d*. Accordingly, the protective layer 15*c* protects the first ground conductor layer 128.

The outer electrodes 24 and 26 are provided on the lower principal surface of the insulator layer 14*f*. The other structures of the outer electrodes 24 and 26 are the same as in the multilayer board 10 and thus description thereof is omitted.

The structure of the opening H is the same as that of the multilayer board 10 and thus description thereof is omitted.

The other structure of the multilayer board 10*h* is the same as that of the multilayer board 10 and thus description thereof is omitted.

The multilayer board 10*h* can achieve the same effects as the multilayer board 10. In addition, according to the multilayer board 10*h*, the effects (a) to (c) can be achieved.

(d) According to the multilayer board 10*h*, characteristic impedance can be matched at a position close to the first radiation conductor layer 16 by adjusting the lengths (widths) of the first wiring layer 20 and the second wiring layer 22 in a direction orthogonal to the up-down direction. Accordingly, it is possible to supply reflected waves to the first radiation conductor layer 16 with a reduced loss.

Ninth Modification

Figure 18:
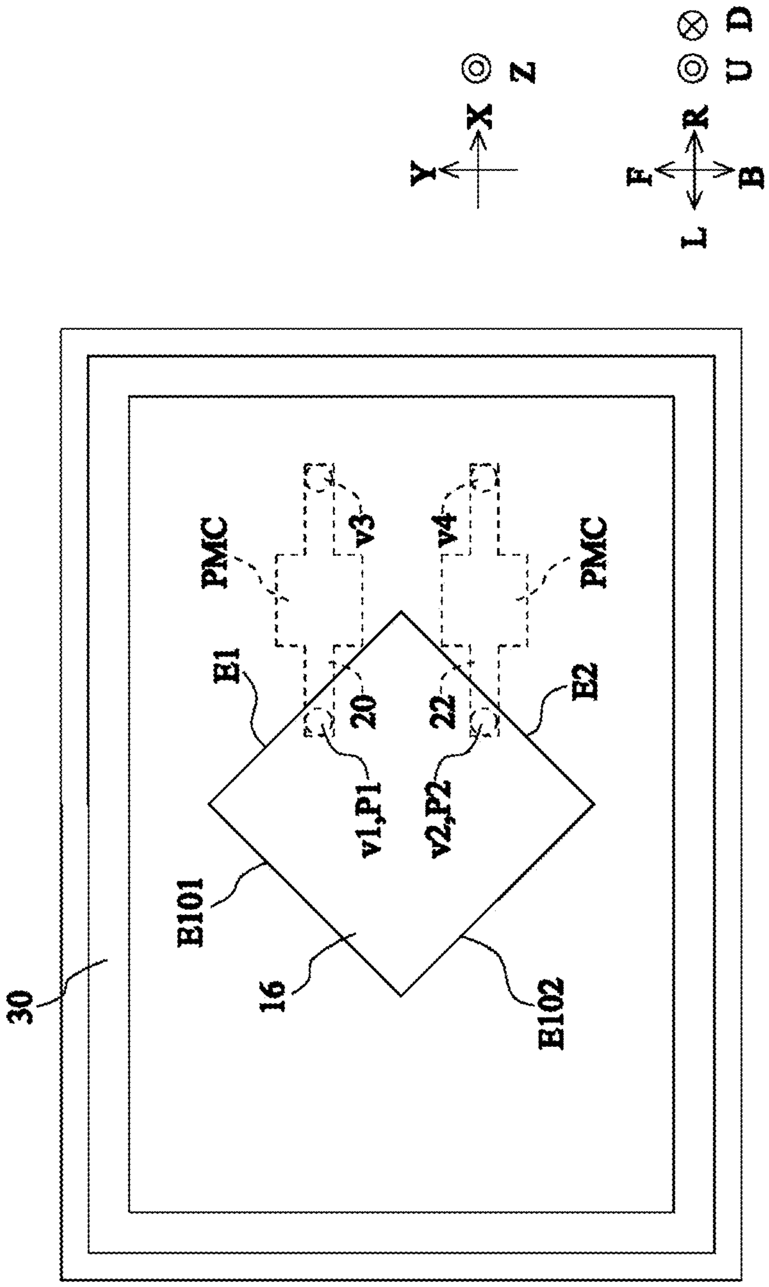
FIG. 18 is a top view of a multilayer board.

A multilayer board 10*i* according to a ninth modification will be described below. FIG. 18 is a top view of the multilayer board 10*i*.

The multilayer board 10*i* is different from the multilayer board 10 in that the first wiring layer 20 and the second wiring layer 22 each include a matching portion PMC. In the present modification, the length of the matching portion PMC of the first wiring layer 20 in the front-back direction is longer than the length of the other part of the first wiring layer 20 than the matching portion PMC in the front-back direction. The length of the matching portion PMC of the second wiring layer 22 in the front-back direction is longer than the length of the other part of the second wiring layer 22 than the matching portion PMC in the front-back direction. The matching portions PMC do not overlap the first radiation conductor layer 16 in a view along the up-down direction (Z-axis direction).

The multilayer board 10*i* can achieve the same effects as the multilayer board 10. In addition, according to the multilayer board 10*i*, coupling between each matching portion PMC and the first radiation conductor layer 16 is prevented. More specifically, it is possible to supply reflected waves to the first radiation conductor layer 16 with a reduced loss when the matching portions PMC are provided at positions close to the first radiation conductor layer 16, and thus the matching portions PMC are preferably provided at the first wiring layer 20 and the second wiring layer 22. The matching portions PMC do not overlap the first radiation conductor layer 16 in a view along the up-down direction (Z-axis direction). Accordingly, the matching portions PMC are positioned far from the first radiation conductor layer 16. As a result, according to the multilayer board 10*i*, coupling between each matching portion PMC and the first radiation conductor layer 16 is prevented.

Tenth Modification

Figure 19:
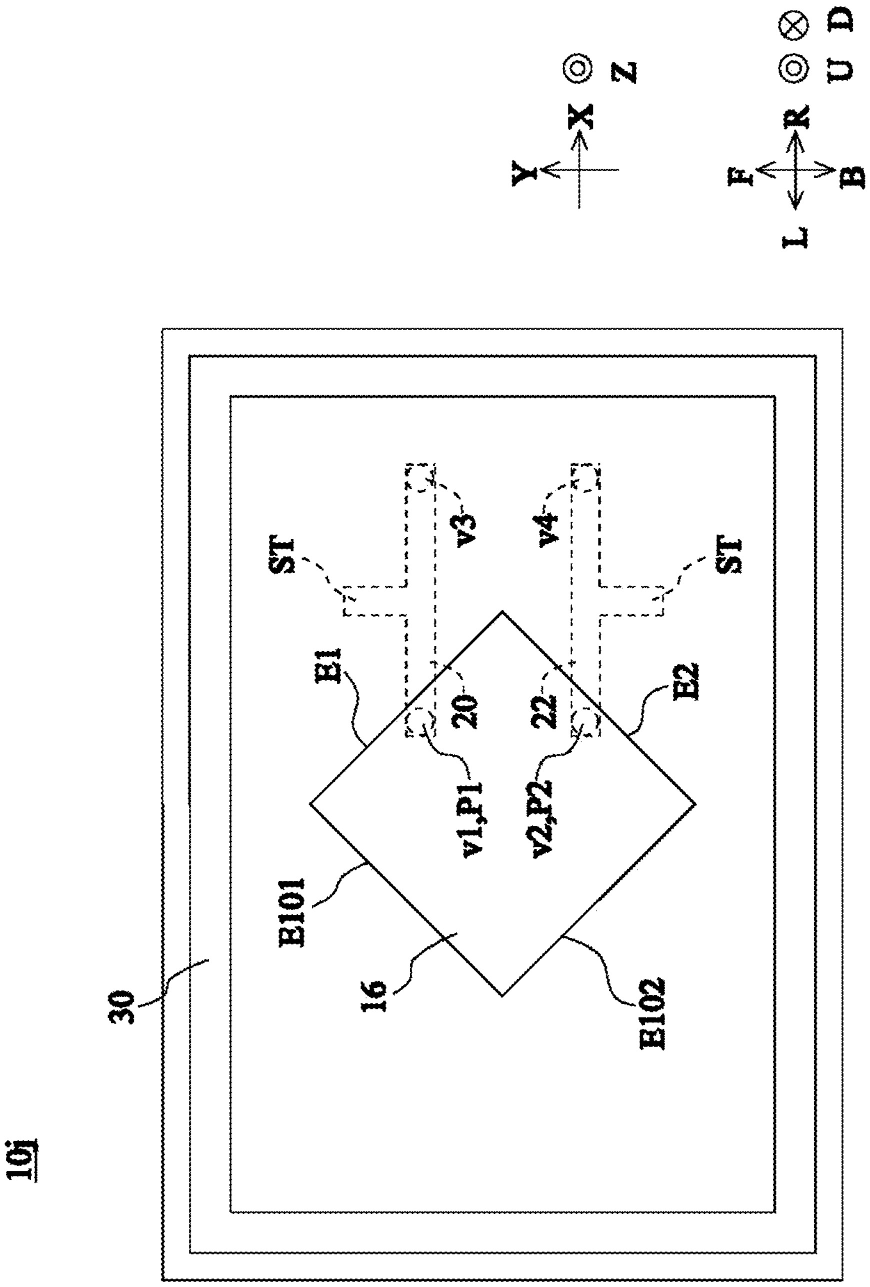
FIG. 19 is a top view of a multilayer board.

A multilayer board 10*j* according to a tenth modification will be described below. FIG. 19 is a top view of the multilayer board 10*j*.

The multilayer board 10*j* is different from the multilayer board 10 in that the first wiring layer 20 and the second wiring layer 22 each include a stub portion ST. In the present modification, each stub portion ST is an open stub not connected to the ground potential. Each stub portion ST has a linear shape extending in the front-back direction in a view along the up-down direction. The stub portions ST do not overlap the first radiation conductor layer 16 in a view along the up-down direction (Z-axis direction).

The multilayer board 10*j* can achieve the same effects as the multilayer board 10. In addition, according to the multilayer board 10*j*, coupling between each stub portion ST and the first radiation conductor layer 16 is prevented. More specifically, it is possible to supply reflected waves to the first radiation conductor layer 16 with a reduced loss when the stub portions ST are provided at positions close to the first radiation conductor layer 16, the stub portions ST are provided at the first wiring layer 20 and the second wiring layer 22. The stub portions ST do not overlap the first radiation conductor layer 16 in a view along the up-down direction (Z-axis direction). Accordingly, the stub portions ST are positioned far from the first radiation conductor layer 16. As a result, according to the multilayer board 10*i*, coupling between each stub portion ST and the first radiation conductor layer 16 is prevented.

Eleventh Modification

Figure 20:
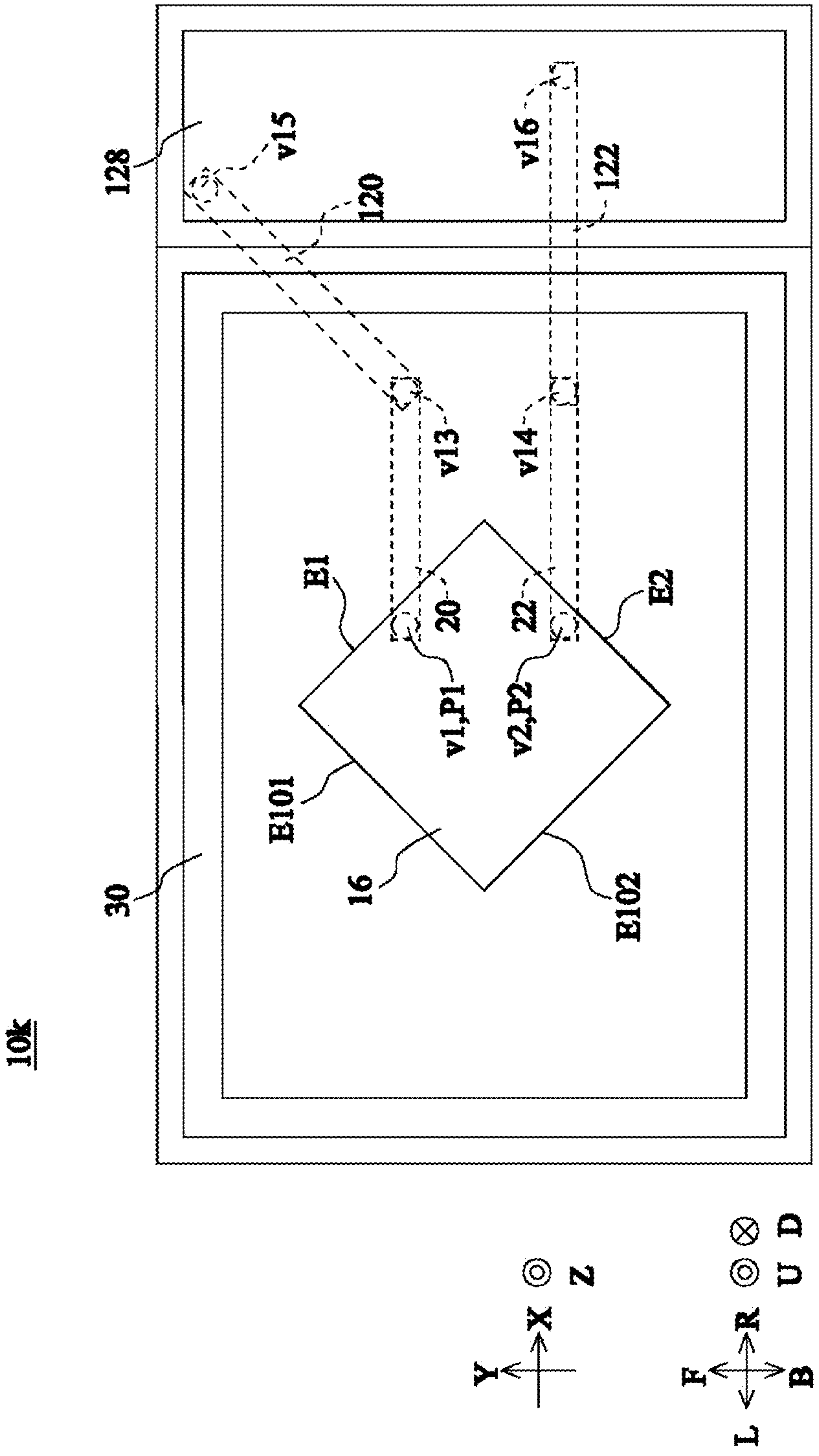
FIG. 20 is a top view of a multilayer board.

A multilayer board 10*k* according to an eleventh modification will be described below. FIG. 20 is a top view of the multilayer board 10*k*.

The multilayer board 10*k* is different from the multilayer board 10*h* in that the seventh wiring layer 120 is orthogonal to the first straight line E1 in a view along the up-down direction (Z-axis direction). The other structure of the multilayer board 10*k* is the same as that of the multilayer board 10*h* and thus description thereof is omitted.

The multilayer board 10*k* can achieve the same effects as the multilayer board 10*h*. In addition, according to the multilayer board 10*k*, the distance between the seventh wiring layer 120 and the first radiation conductor layer 16 is longer than the distance between the first wiring layer 20 and the first radiation conductor layer 16. Thus, the seventh wiring layer 120 may be orthogonal to the first straight line E1 in a view along the up-down direction (Z-axis direction) as long as the first wiring layer 20 intersects but is not orthogonal to the first straight line E1 in a view along the up-down direction (Z-axis direction) and the second wiring layer 22 intersects but is not orthogonal to the second straight line E2 in a view along the up-down direction (Z-axis direction).

(e) According to the multilayer board 10*k*, the freedom of wiring arrangement improves. More specifically, the seventh wiring layer 120 may be orthogonal to the first straight line E1 in a view along the up-down direction (Z-axis direction). The eighth wiring layer 122 may be orthogonal to the second straight line E2 in a view along the up-down direction (Z-axis direction).

Twelfth Modification

Figure 21:
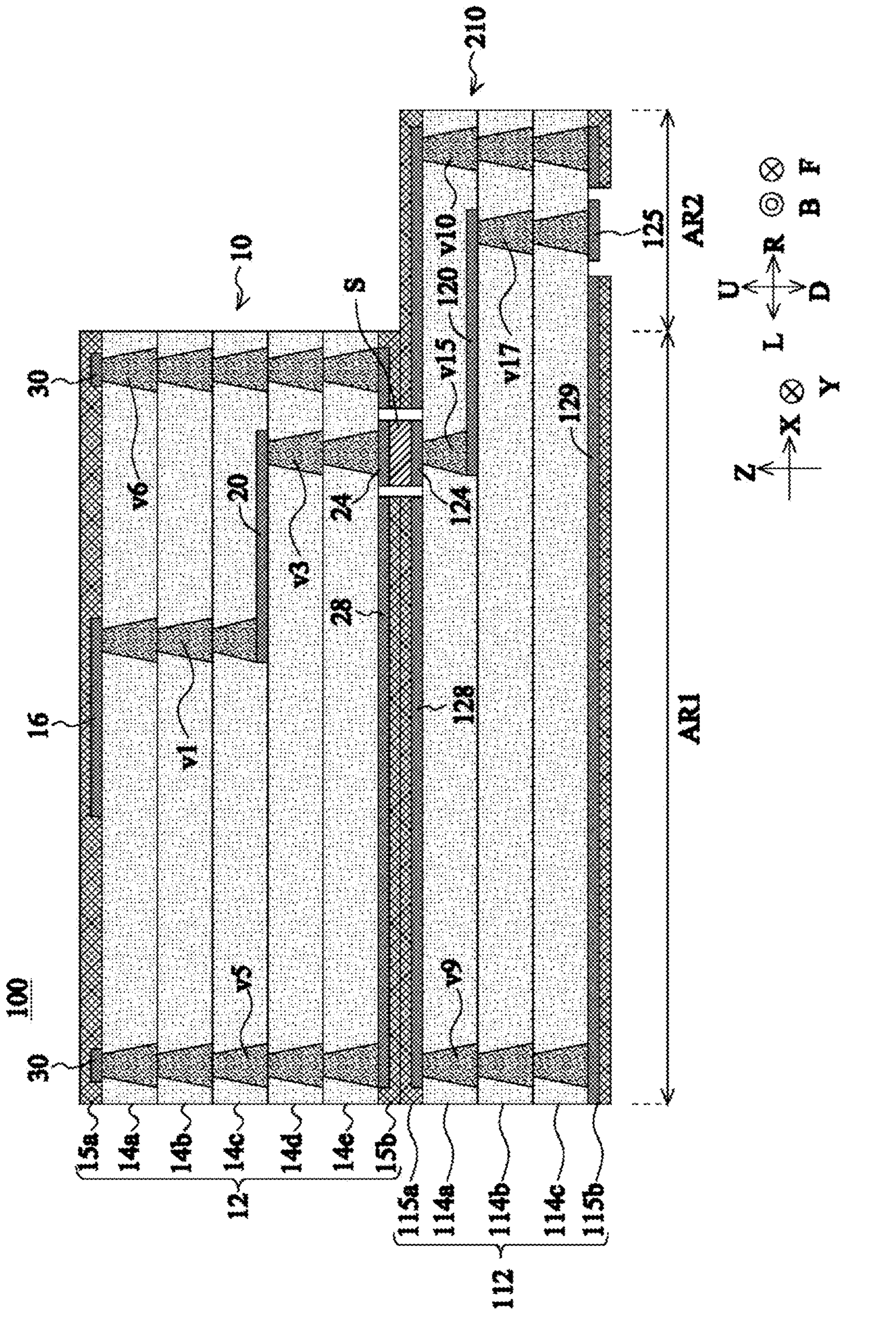
FIG. 21 is a cross-sectional view of an antenna module.
Figure 22:
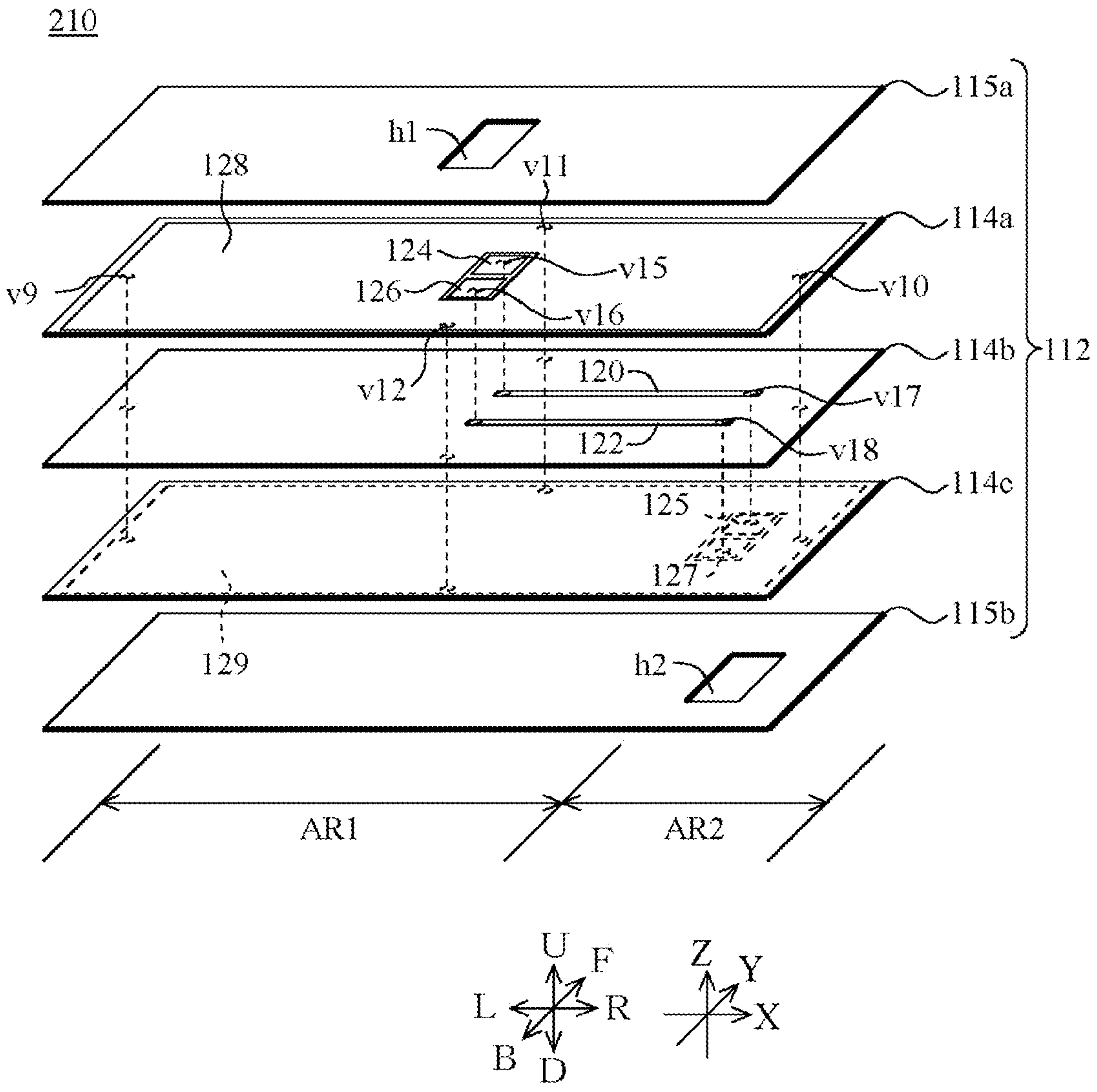
FIG. 22 is an exploded perspective view of a multilayer board.

An antenna module 100 according to a twelfth modification will be described below. FIG. 21 is a cross-sectional view of the antenna module 100. FIG. 22 is an exploded perspective view of a multilayer board 210.

The antenna module 100 is used for a wireless communication terminal such as a smartphone. The antenna module 100 includes the multilayer board 10 and the multilayer board 210.

As illustrated in FIG. 21, the multilayer board 210 is positioned on the lower side of the multilayer board 10 (on the negative side thereof along the Z axis). The multilayer board 210 has a region AR1 overlapping the multilayer board 10 in a view along the up-down direction (Z-axis direction), and a region AR2 not overlapping the multilayer board 10 in a view along the up-down direction (Z-axis direction). The structure of the multilayer board 210 will be described below in detail.

The multilayer board 210 includes a multilayer body 112, the seventh wiring layer 120, the eighth wiring layer 122, outer electrodes 124 to 127, the first ground conductor layer 128, a second ground conductor layer 129, and interlayer connection conductors v9 to v12 and v15 to v18. The seventh wiring layer 120, the eighth wiring layer 122, the outer electrodes 124 to 127, the first ground conductor layer 128, the second ground conductor layer 129, and the interlayer connection conductors v9 to v12 and v15 to v18 are provided in the multilayer body 112 as illustrated in FIG. 22. The multilayer board 10 corresponds to a "first substrate" of the present disclosure. The multilayer board 210 corresponds to a "second substrate" of the present disclosure. The multilayer body 12 corresponds to a "first multilayer body" of the present disclosure. The multilayer body 112 corresponds to a "second multilayer body" of the present disclosure.

The multilayer body 112 has a plate shape. The multilayer body 112 has a rectangular shape in a view along the up-down direction. The multilayer body 112 has a structure in which insulator layers 114*a* to 114*c* and protective layers 115*a* and 115*b* are laminated in the up-down direction (Z-axis direction). The length of the multilayer body 112 in the up-down direction is shorter than the length of the multilayer body 12 in the up-down direction. Accordingly, the length of the multilayer board 210 in the up-down direction (Z-axis direction) is shorter than the length of the multilayer board 10 in the up-down direction (Z-axis direction). The protective layer 115*a*, the insulator layers 114*a* to 114*c*, and the protective layer 115*b* are arranged in the stated order from top. The material of the insulator layers 114*a* to 114*c* is thermoplastic resin such as polyimide or liquid crystal polymer. The multilayer body 112 is flexible. The multilayer board 210 is flexible. The protective layers 115*a* and 115*b* will be described later.

The first ground conductor layer 128 is provided on the upper principal surface of the insulator layer 14*a*. The first ground conductor layer 128 has a rectangular shape in a view along the up-down direction. The long sides of the first ground conductor layer 128 extend in the right-left direction. The short sides of the first ground conductor layer 128 extend in the front-back direction. The first ground conductor layer 128 overlaps the seventh wiring layer 120 and the eighth wiring layer 122 in a view along the up-down direction. The first ground conductor layer 128 is connected to the ground potential.

The outer electrodes 124 and 126 are provided on the upper principal surface of the insulator layer 114*a*. The outer electrodes 124 and 126 do not contact the first ground conductor layer 128. Accordingly, the outer electrodes 124 and 126 are positioned in an opening provided through the first ground conductor layer 128. The outer electrode 124 overlaps the left end portion of the seventh wiring layer 120 in a view along the up-down direction. The outer electrode 126 overlaps the left end portion of the eighth wiring layer 122 in a view along the up-down direction.

The seventh wiring layer 120 is positioned on the lower side of the first ground conductor layer 128 and on the upper side of the second ground conductor layer 129. In the present modification, the seventh wiring layer 120 is positioned on the upper principal surface of the insulator layer 114*b*. The seventh wiring layer 120 has a linear shape extending in the right-left direction in a view along the up-down direction. As illustrated in FIG. 21, in the antenna module 100, the left end of the seventh wiring layer 120 overlaps the first wiring layer 20 in a view along the up-down direction. In the antenna module 100, the right end of the seventh wiring layer 120 does not overlap the first wiring layer 20. The seventh wiring layer 120 does not overlap the first radiation conductor layer 16 in a view along the up-down direction. The distance between the seventh wiring layer 120 and the first radiation conductor layer 16 is longer than the distance between the first wiring layer 20 and the first radiation conductor layer 16.

As illustrated in FIG. 22, the eighth wiring layer 122 is positioned on the lower side of the first ground conductor layer 128 and on the upper side of the second ground conductor layer 129. In the present modification, the eighth wiring layer 122 is positioned on the upper principal surface of the insulator layer 114*b*. The eighth wiring layer 122 is positioned on the back side of the seventh wiring layer 120 in a view along the up-down direction. The eighth wiring layer 122 has a linear shape extending in the right-left direction in a view along the up-down direction. As illustrated in FIG. 21, in the antenna module 100, the left end of the eighth wiring layer 122 overlaps the second wiring layer 22 in a view along the up-down direction. In the antenna module 100, the right end of the eighth wiring layer 122 does not overlap the second wiring layer 22. The eighth wiring layer 122 does not overlap the first radiation conductor layer 16 in a view along the up-down direction. The distance between the eighth wiring layer 122 and the first radiation conductor layer 16 is longer than the distance between the second wiring layer 22 and the first radiation conductor layer 16.

As illustrated in FIG. 22, the second ground conductor layer 129 is provided on the lower principal surface of the insulator layer 114*c*. Accordingly, the second ground conductor layer 129 is positioned on the lower side of the seventh wiring layer 120 and the eighth wiring layer 122 (on the negative side thereof along the Z axis). The second ground conductor layer 129 has a rectangular shape in a view along the up-down direction. The long sides of the second ground conductor layer 129 extend in the right-left direction. The short sides of the second ground conductor layer 129 extend in the front-back direction. The second ground conductor layer 129 overlaps the seventh wiring layer 120 and the eighth wiring layer 122 in a view along the up-down direction (Z-axis direction). As illustrated in FIG. 21, the second ground conductor layer 129 overlaps the first radiation conductor layer 16 in a view along the up-down direction (Z-axis direction). In other words, the second ground conductor layer 129 is disposed in both the region AR1 overlapping the multilayer board 10 and the region AR2 not overlapping the multilayer board 10. The second ground conductor layer 129 is connected to the ground potential. The second ground conductor layer 129 corresponds to a "ground conductor layer" of the present disclosure.

Outer electrodes 125 and 127 are provided on the lower principal surface of the insulator layer 114*c*. The outer electrodes 125 and 127 do not contact the second ground conductor layer 129. Accordingly, the outer electrodes 125 and 127 are positioned in an opening provided through the second ground conductor layer 129. The outer electrode 125 overlaps the right end portion of the seventh wiring layer 120 in a view along the up-down direction. The outer electrode 127 overlaps the right end portion of the eighth wiring layer 122 in a view along the up-down direction.

The interlayer connection conductors v9 to v12 electrically connect the first ground conductor layer 128 and the second ground conductor layer 129. More specifically, the interlayer connection conductors v9 to v12 penetrate through the insulator layers 114*a* to 114*c* in the up-down direction. The upper ends of the interlayer connection conductors v9 to v12 contact the first ground conductor layer 128. The lower ends of the interlayer connection conductors v9 to v12 contact the second ground conductor layer 129.

The interlayer connection conductor v15 electrically connects the outer electrode 124 and the seventh wiring layer 120. More specifically, the interlayer connection conductor v15 penetrates through the insulator layer 114*a* in the up-down direction. The upper end of the interlayer connection conductor v15 contacts the outer electrode 124. The lower end of the interlayer connection conductor v15 contacts the left end portion of the seventh wiring layer 120.

The interlayer connection conductor v16 electrically connects the outer electrode 126 and the eighth wiring layer 122. More specifically, the interlayer connection conductor v16 penetrates through the insulator layer 114*a* in the up-down direction. The upper end of the interlayer connection conductor v16 contacts the outer electrode 126. The lower end of the interlayer connection conductor v16 contacts the left end portion of the eighth wiring layer 122.

The interlayer connection conductor v17 electrically connects the seventh wiring layer 120 and the outer electrode 125. More specifically, the interlayer connection conductor v17 penetrates through the insulator layers 114*b* and 114*c* in the up-down direction. The upper end of the interlayer connection conductor v17 contacts the right end portion of the seventh wiring layer 120. The lower end of the interlayer connection conductor v15 contacts the outer electrode 125.

The interlayer connection conductor v18 electrically connects the eighth wiring layer 122 and the outer electrode 127. More specifically, the interlayer connection conductor v18 penetrates through the insulator layers 114*b* and 114*c* in the up-down direction. The upper end of the interlayer connection conductor v18 contacts the right end portion of the eighth wiring layer 122. The lower end of the interlayer connection conductor v18 contacts the outer electrode 127.

The protective layers 115*a* and 115*b* have dielectric constants larger than the dielectric constants of the insulator layers 114*a* to 114*c*. The protective layer 115*a* covers the upper principal surface of the insulator layer 114*a*. Accordingly, the protective layer 115*a* protects the first ground conductor layer 128. However, an opening h1 is provided through the protective layer 115*b*. Accordingly, the outer electrodes 124 and 126 are exposed to the outside of the multilayer board 210 through the opening h1. The protective layer 115*b* covers the lower principal surface of the insulator layer 114*c*. Accordingly, the protective layer 115*b* protects the second ground conductor layer 129. However, an opening h2 is provided through the protective layer 115*b*. Accordingly, the outer electrodes 125 and 127 are exposed to the outside of the multilayer board 210 through the opening h2.

The multilayer board 210 is mounted on the multilayer board 10. Specifically, the outer electrode 124 is fixed to the outer electrode 24 by solder S. Accordingly, the seventh wiring layer 120 is electrically connected to the first wiring layer 20. Thus, the first high-frequency signal is input to or output from the outer electrode 125. The outer electrode 126 is fixed to the outer electrode 26 by the solder S. Accordingly, the eighth wiring layer 122 is electrically connected to the second wiring layer 22. Thus, the second high-frequency signal is input to or output from the outer electrode 127.

The antenna module 100 can achieve the same effects as the multilayer board 10. In addition, according to the antenna module 100, the effects (d) and (e) can be achieved.

(f) According to the antenna module 100, bending fabrication of the antenna module 100 is easy. More specifically, the multilayer board 210 has the region AR1 overlapping the multilayer board 10 in a view along the up-down direction (Z-axis direction), and the region AR2 not overlapping the multilayer board 10 in a view along the up-down direction (Z-axis direction). The length of the multilayer board 210 in the up-down direction (Z-axis direction) is shorter than the length of the multilayer board 10 in the up-down direction (Z-axis direction). Thus, the region AR2 of the multilayer board 210 is more easily deformable than the multilayer board 10. In other words, the region AR2 of the multilayer board 210 is easily bendable. Accordingly, the antenna module 100 can be easily bend. As a result, bending fabrication of the antenna module 100 is easy.

Thirteenth Modification

Figure 23:
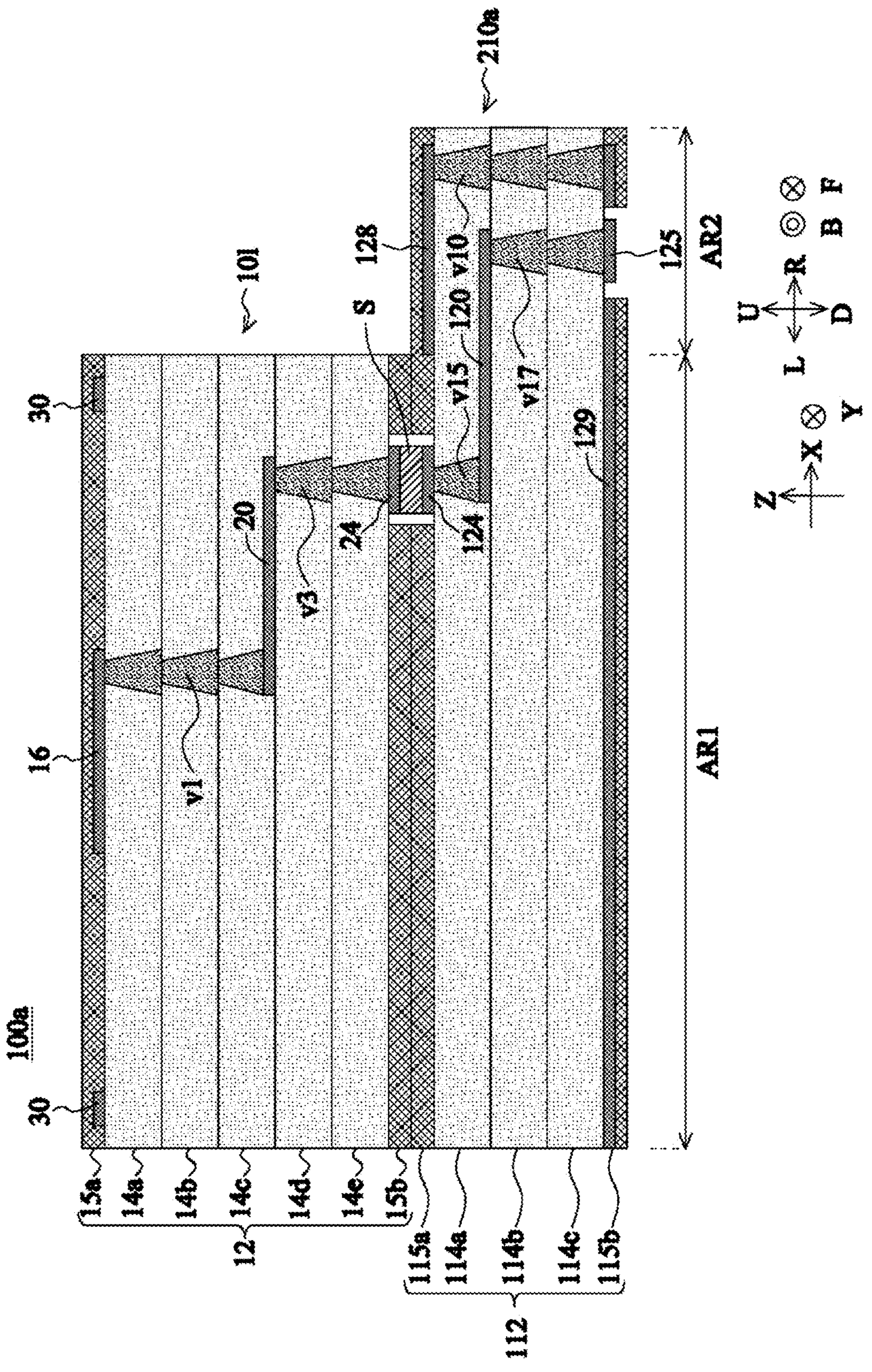
FIG. 23 is a cross-sectional view of an antenna module.

An antenna module 100*a* according to a thirteenth modification will be described below. FIG. 23 is a cross-sectional view of the antenna module 100*a*.

The antenna module 100*a* is different from the antenna module 100 in that the antenna module 100*a* includes a multilayer board 10*l* and a multilayer board 210*a*. The multilayer board 10*l* is different from the multilayer board 10 in that the multilayer board 10*l* does not include the ground conductor layer 28 nor the interlayer connection conductors v5 to v8.

The multilayer board 210*a* is different from the multilayer board 210 in that the first ground conductor layer 128 is positioned only in the region AR2 in a view along the up-down direction as illustrated in FIG. 23. The first ground conductor layer 128 does not overlap the first radiation conductor layer 16 in a view along the up-down direction. In the present modification, the first ground conductor layer 128 is not positioned in the region AR1 in a view along the up-down direction. The other structure of the antenna module 100*a* in the present modification is the same as that of the antenna module 100 and thus description thereof is omitted. In the antenna module 100*a* as described above, the first radiation conductor layer 16 and the second ground conductor layer 129 function as a patch antenna that radiates or receives the first high-frequency signal and the second high-frequency signal.

The antenna module 100*a* can achieve the same effects as the antenna module 100.

(g) According to the antenna module 100*a*, the length of the region AR1 in the up-down direction (Z-axis direction) can be shortened. More specifically, no first ground conductor layer 128 facing the first radiation conductor layer 16 exists. Capacitance generated between the first radiation conductor layer 16 and the second ground conductor layer 129 is dominant as capacitance generated between the first radiation conductor layer 16 and a ground conductor. Thus, the length of the region AR1 in the up-down direction (Z-axis direction) can be shortened when desired capacitance is to be formed.

Other Embodiments

A multilayer board according to the present disclosure is not limited to the multilayer boards 10 and 10*a* to 10*k* but is changeable within the scope of the present disclosure. The structures of the multilayer boards 10 and 10*a* to 10*k* may be optionally combined.

An antenna module according to the present disclosure is not limited to the antenna modules 100 and 100*a* but is changeable within the scope of the present disclosure. The structures of the antenna modules 100 and 100*a* may be optionally combined. The antenna module 100 may include the multilayer boards 10*a* to 10*l*.

The annular ground conductor layer 30 is not an essential component.

The first wiring layer 20 and the second wiring layer 22 do not necessarily need to be parallel to each other. The third wiring layer 220 and the fourth wiring layer 222 do not necessarily need to be parallel to each other. The fifth wiring layer 320 and the sixth wiring layer 322 do not necessarily need to be parallel to each other.

In the multilayer board 10*a*, the first straight line E1 and the second straight line E2 may be positioned on the left side of the first part EP1 of the first outer edge EE1 except for the first straight line E1 and the second straight line E2 (on the negative side thereof along the X axis), and the third straight line E3 and the fourth straight line E4 may be positioned on the right side of the second part EP2 of the second outer edge EE2 except for the third straight line E3 and the fourth straight line E4 (on the positive side thereof along the X axis).

The second straight line E2 only needs to intersect the first straight line E1 in a view along the up-down direction and does not necessarily need to be orthogonal to the first straight line E1. The fourth straight line E4 only needs to intersect the third straight lines E3 in a view along the up-down direction and does not necessarily need to be orthogonal to the third straight line E3. The sixth straight line E6 only needs to intersect the fifth straight line E5 in a view along the up-down direction and does not necessarily need to be orthogonal to the fifth straight line E5.

The first straight line E1 and the second straight line E2 do not necessarily need to intersect each other in a view along the up-down direction.

The first power supply point P1 may be positioned closest to any other point in the first straight line E1 than the middle point of the first straight line E1.

The second power supply point P2 may be positioned closest to any other point in the second straight line E2 than the middle point of the second straight line E2.

The third power supply point P3 may be positioned closest to any other point in the third straight line E3 than the middle point of the third straight line E3.

The fourth power supply point P4 may be positioned closest to any other point in the fourth straight line E4 than the middle point of the fourth straight line E4.

The fifth power supply point P5 may be positioned closest to any other point in the fifth straight line E5 than the middle point of the fifth straight line E5.

The sixth power supply point P6 may be positioned closest to any other point in the sixth straight line E6 than the middle point of the sixth straight line E6.

The rigid portion A3 does not necessarily need to overlap the protective layer 15*a* in a view along the up-down direction (Z-axis direction).

The first ground conductor layer 128 is not an essential component.

The seventh wiring layer 120 and the eighth wiring layer 122 may each overlap the first radiation conductor layer 16 in a view along the up-down direction. However, coupling between each of the seventh wiring layer 120 and the eighth wiring layer 122 and the first radiation conductor layer 16 can be prevented by increasing the distance between each of the seventh wiring layer 120 and the eighth wiring layer 122 and the first radiation conductor layer 16, and thus the seventh wiring layer 120 and the eighth wiring layer 122 each do not overlap the first radiation conductor layer 16 in a view along the up-down direction.

The matching portions PMC may be included in the seventh wiring layer 120 and the eighth wiring layer 122.

Even when the matching portions PMC are provided separately from the first wiring layer 20, the second wiring layer 22, the seventh wiring layer 120, and the eighth wiring layer 122, the matching portions PMC only need not to overlap the first radiation conductor layer 16 in a view along the up-down direction. In this case, each matching portions PMC may be formed of an electronic component such as a chip capacitor constituting a matching circuit for characteristic impedance matching.

The stub portions ST may be included in the seventh wiring layer 120 and the eighth wiring layer 122. Each stub portion ST may be a short stub connected to the ground potential.

The present disclosure has a structure described below.

(1) A multilayer board including:

a multilayer body having a structure in which a plurality of insulator layers are laminated in a Z-axis direction;

a first radiation conductor layer provided in the multilayer body and having a first outer edge in a view along the Z-axis direction, the first outer edge including a first straight line and a second straight line;

a ground conductor layer provided in the multilayer body, positioned on the negative side of the first radiation conductor layer along a Z axis, and overlapping the first radiation conductor layer in a view along the Z-axis direction;

a first wiring layer provided in the multilayer body, positioned on the negative side of the first radiation conductor layer along the Z axis and on the positive side of the ground conductor layer along the Z axis, electrically connected to the first radiation conductor layer at a first power supply point, and intersecting but not orthogonal to the first straight line in a view along the Z-axis direction, the first power supply point being positioned closest to the first straight line in the first outer edge; and a second wiring layer provided in the multilayer body, positioned on the negative side of the first radiation conductor layer along the Z axis and on the positive side of the ground conductor layer along the Z axis, electrically connected to the first radiation conductor layer at a second power supply point, and intersecting but not orthogonal to the second straight line in a view along the Z-axis direction, the second power supply point being positioned closest to the second straight line in the first outer edge.

(2) The multilayer board according to (1), in which a first region is defined to be a region through which the first straight line passes in a view along the Z-axis direction when the first straight line is moved in a direction orthogonal to the first straight line, the first wiring layer is disposed in both the first region and a region outside the first region in a view along the Z-axis direction, a second region is defined to be a region through which the second straight line passes in a view along the Z-axis direction when the second straight line is moved in a direction orthogonal to the second straight line, and the second wiring layer is disposed in both the second region and a region outside the second region in a view along the Z-axis direction.

(3) The multilayer board according to (1) or (2), further including:

a second radiation conductor layer provided in the multilayer body and having a second outer edge in a view along the Z-axis direction, the second outer edge including a third straight line and a fourth straight line;

a third wiring layer provided in the multilayer body, positioned on the negative side of the second radiation conductor layer along the Z axis and on the positive side of the ground conductor layer along the Z axis, electrically connected to the second radiation conductor layer at a third power supply point, and intersecting but not orthogonal to the third straight line in a view along the Z-axis direction, the third power supply point being positioned closest to the third straight line in the second outer edge; and a fourth wiring layer provided in the multilayer body, positioned on the negative side of the second radiation conductor layer along the Z axis and on the positive side of the ground conductor layer along the Z axis, electrically connected to the second radiation conductor layer at a fourth power supply point, and intersecting but not orthogonal to the fourth straight line in a view along the Z-axis direction, the fourth power supply point being positioned closest to the fourth straight line in the second outer edge, in which the ground conductor layer overlaps the second radiation conductor layer in a view along the Z-axis direction.

(4) The multilayer board according to (3), in which the second radiation conductor layer is positioned on the positive side of the first radiation conductor layer along an X axis, the X axis is orthogonal to the Z axis, the first straight line and the second straight line are positioned on the positive side of a first part in the first outer edge except for the first straight line and the second straight line along the X axis, and the third straight line and the fourth straight line are positioned on the negative side of a second part in the second outer edge except for the third straight line and the fourth straight line along the X axis.

(5) The multilayer board according to (3) or (4), further including:

a third radiation conductor layer provided in the multilayer body and having a third outer edge in a view along the Z-axis direction, the third outer edge including a fifth straight line and a sixth straight line;

a fifth wiring layer provided in the multilayer body, positioned on the negative side of the third radiation conductor layer along the Z axis and on the positive side of the ground conductor layer along the Z axis, electrically connected to the third radiation conductor layer at a fifth power supply point, and intersecting but not orthogonal to the fifth straight line in a view along the Z-axis direction, the fifth power supply point being positioned closest to the fifth straight line in the third outer edge; and a sixth wiring layer provided in the multilayer body, positioned on the negative side of the third radiation conductor layer along the Z axis and on the positive side of the ground conductor layer along the Z axis, electrically connected to the third radiation conductor layer at a sixth power supply point, and intersecting but not orthogonal to the sixth straight line in a view along the Z-axis direction, the sixth power supply point being positioned closest to the sixth straight line in the third outer edge, in which the ground conductor layer overlaps the third radiation conductor layer in a view along the Z-axis direction.

(6) The multilayer board according to (5), in which the second radiation conductor layer is positioned on the positive side of the first radiation conductor layer along an X axis, the third radiation conductor layer is positioned on the positive side of the second radiation conductor layer along the X axis, the X axis is orthogonal to the Z axis, the first straight line and the second straight line are positioned on the positive side of a first part in the first outer edge except for the first straight line and the second straight line along the X axis, the third straight line and the fourth straight line are positioned on the negative side of a second part in the second outer edge except for the third straight line and the fourth straight line along the X axis, and the fifth straight line and the sixth straight line are positioned on the positive side of a third part in the third outer edge except for the fifth straight line and the sixth straight line along the X axis.

(7) The multilayer board according to (5), in which the second radiation conductor layer is positioned on the positive side of the first radiation conductor layer along an X axis, the X axis is orthogonal to the Z axis, a Y axis is orthogonal to the X axis and the Z axis, the third radiation conductor layer is positioned on the positive side of the second radiation conductor layer along the X axis, the first straight line, the third straight line, and the fifth straight line are parallel to the X axis, the second straight line, the fourth straight line, and the sixth straight line overlap one another in a view along an X-axis direction, an end of the first straight line on the positive side along the X axis is connected to an end of the second straight line on the positive side along the Y axis, an end of the third straight line on the positive side along the X axis is connected to an end of the fourth straight line on the positive side along the Y axis, and an end of the fifth straight line on the positive side along the X axis is connected to an end of the sixth straight line on the positive side along the Y axis.

(8) The multilayer board according to (5), in which the second radiation conductor layer is positioned on the positive side of the first radiation conductor layer along an X axis, the X axis is orthogonal to the Z axis, a Y axis is orthogonal to the X axis and the Z axis, the third radiation conductor layer is positioned on the positive side of the second radiation conductor layer along the X axis, the first straight line, the fourth straight line, and the fifth straight line are parallel to the X axis, the second straight line, the third straight line, and the sixth straight line overlap one another in a view along an X-axis direction, an end of the first straight line on the positive side along the X axis is connected to an end of the second straight line on the positive side along the Y axis, an end of the third straight line on the negative side along the Y axis is connected to an end of the fourth straight line on the negative side along the X axis, and an end of the fifth straight line on the positive side along the X axis is connected to an end of the sixth straight line on the positive side along the Y axis.

(9) The multilayer board according to (5), in which the second radiation conductor layer is positioned on the positive side of the first radiation conductor layer along an X axis, the X axis is orthogonal to the Z axis, a Y axis is orthogonal to the X axis and the Z axis, the third radiation conductor layer is positioned on the positive side of the second radiation conductor layer along the X axis, the first straight line and the second straight line are positioned on the negative side of a first part in the first outer edge except for the first straight line and the second straight line along the X axis, the third straight line and the fourth straight line are positioned on the negative side of a second part in the second outer edge except for the third straight line and the fourth straight line along the Y axis, and the fifth straight line and the sixth straight line are positioned on the negative side of a third part in the third outer edge except for the fifth straight line and the sixth straight line along the X axis.

(10) The multilayer board according to (1) or (2), further including:

a second radiation conductor layer provided in the multilayer body, positioned on the negative side of the first radiation conductor layer along the Z axis, overlapping the first radiation conductor layer in a view along the Z-axis direction, and having a second outer edge in a view along the Z-axis direction, the second outer edge including a third straight line and a fourth straight line;

a third wiring layer provided in the multilayer body, positioned on the negative side of the second radiation conductor layer along the Z axis and on the positive side of the ground conductor layer along the Z axis, electrically connected to the second radiation conductor layer at a third power supply point, and intersecting but not orthogonal to the third straight line in a view along the Z-axis direction, the third power supply point being positioned closest to the third straight line in the second outer edge; and a fourth wiring layer provided in the multilayer body, positioned on the negative side of the second radiation conductor layer along the Z axis and on the positive side of the ground conductor layer along the Z axis, electrically connected to the second radiation conductor layer at a fourth power supply point, and intersecting but not orthogonal to the fourth straight line in a view along the Z-axis direction, the fourth power supply point being positioned closest to the fourth straight line in the second outer edge, in which the ground conductor layer overlaps the second radiation conductor layer in a view along the Z-axis direction, the first straight line is parallel to the third straight line, the second straight line is parallel to the fourth straight line, an X axis is orthogonal to the Z axis, an end of the first straight line on the positive side along the X axis is connected to an end of the second straight line on the positive side along the X axis, an end of the third straight line on the positive side along the X axis is connected to an end of the fourth straight line on the positive side along the X axis, the first wiring layer intersects but is not orthogonal to the first straight line and the third straight line in a view along the Z-axis direction, and the second wiring layer intersects but is not orthogonal to the second straight line and the fourth straight line in a view along the Z-axis direction.

(11) The multilayer board according to any one of (1) to (10), further including an annular ground conductor layer provided in the multilayer body and positioned on the positive side of the ground conductor layer along the Z axis, in which the annular ground conductor layer has an annular shape surrounding the first radiation conductor layer in a view along the Z-axis direction.

(12) The multilayer board according to (11), in which the first radiation conductor layer includes the first straight line, the second straight line, a seventh straight line, and an eighth straight line in a view along the Z-axis direction and has a rectangular shape in a view along the Z-axis direction, a first distance is defined to be distance from the center of the first straight line to the annular ground conductor layer in a direction orthogonal to the first straight line, a second distance is defined to be distance from the center of the second straight line to the annular ground conductor layer in a direction orthogonal to the second straight line, a third distance is defined to be distance from the center of the seventh straight line to the annular ground conductor layer in a direction orthogonal to the seventh straight line, a fourth distance is defined to be distance from the center of the eighth straight line to the annular ground conductor layer in a direction orthogonal to the eighth straight line, and the first distance, the second distance, the third distance, and the fourth distance are equal to one another.

(13) The multilayer board according to any one of (1) to (12), in which the first wiring layer and the second wiring layer each include a matching portion, and the matching portion does not overlap the first radiation conductor layer in a view along the Z-axis direction.

(14) The multilayer board according to any one of (1) to (12), in which the first wiring layer and the second wiring layer each include a stub portion, and the stub portion does not overlap the first radiation conductor layer in a view along the Z-axis direction.

(15) The multilayer board according to any one of (1) to (14), further including:

a rigid portion; and a flexible portion, in which the length of the flexible portion in the Z-axis direction is shorter than the length of the rigid portion in the Z-axis direction.

(16) The multilayer board according to (15), further including an annular ground conductor layer provided in the multilayer body and positioned on the positive side of the ground conductor layer along the Z axis, in which the annular ground conductor layer has an annular shape surrounding the first radiation conductor layer in a view along the Z-axis direction, and no ground conductor is provided between the annular ground conductor layer and the ground conductor layer at the rigid portion.

(17) The multilayer board according to (15) or (16), further including:

a seventh wiring layer provided in the multilayer body, positioned on the negative side of the first wiring layer along the Z axis and on the positive side of the ground conductor layer along the Z axis, and electrically connected to the first wiring layer; and an eighth wiring layer provided in the multilayer body, positioned on the negative side of the second wiring layer along the Z axis and on the positive side of the ground conductor layer along the Z axis, and electrically connected to the second wiring layer.

(18) The multilayer board according to (17), in which the seventh wiring layer and the eighth wiring layer do not overlap the first radiation conductor layer in a view along the Z-axis direction.

(19) An antenna module including:

a first substrate; and a second substrate that is flexible, in which the first substrate includes

- a first multilayer body having a structure in which a plurality of insulator layers are laminated in a Z-axis direction,
- a first radiation conductor layer provided in the first multilayer body and having a first outer edge in a view along the Z-axis direction, the first outer edge including a first straight line and a second straight line,
- a first wiring layer provided in the first multilayer body, positioned on the negative side of the first radiation conductor layer along the Z axis, electrically connected to the first radiation conductor layer at a first power supply point, and intersecting but not orthogonal to the first straight line in a view along the Z-axis direction, the first power supply point being positioned closest to the first straight line in the first outer edge, and
- a second wiring layer provided in the first multilayer body, positioned on the negative side of the first radiation conductor layer along the Z axis, electrically connected to the first radiation conductor layer at a second power supply point, and intersecting but not orthogonal to the second straight line in a view along the Z-axis direction, the second power supply point being positioned closest to the second straight line in the first outer edge, the second substrate includes

- a second multilayer body having a structure in which a plurality of insulator layers are laminated in the Z-axis direction,
- a seventh wiring layer provided in the second multilayer body and electrically connected to the first wiring layer,
- an eighth wiring layer provided in the second multilayer body and electrically connected to the second wiring layer, and
- a ground conductor layer provided in the second multilayer body, positioned on the negative side of the seventh wiring layer and the eighth wiring layer along the Z axis, and overlapping the first radiation conductor layer, the seventh wiring layer, and the eighth wiring layer in a view along the Z-axis direction, the length of the second substrate in the Z-axis direction is shorter than the length of the first substrate in the Z-axis direction, and the second substrate is positioned on the negative side of the first substrate along the Z axis and has a region not overlapping the first substrate in a view along the Z-axis direction.

What is claimed is:

1. A multilayer board comprising:

a rigid portion;

a flexible portion;

a multilayer body having a structure in which a plurality of insulator layers are laminated in a Z-axis direction, wherein a length of the flexible portion in the Z-axis direction is shorter than a length of the rigid portion in the Z-axis direction;

a first radiation conductor layer provided in the multilayer body and having a first outer edge in a view along the Z-axis direction, the first outer edge including a first straight line and a second straight line;

a ground conductor layer provided in the multilayer body, positioned on a negative side of the first radiation conductor layer along a Z axis, and overlapping the first radiation conductor layer in a view along the Z-axis direction;

a first wiring layer provided in the multilayer body, positioned on the negative side of the first radiation conductor layer along the Z axis and on a positive side of the ground conductor layer along the Z axis, electrically connected to the first radiation conductor layer at a first power supply point, and intersecting but not orthogonal to the first straight line in a view along the Z-axis direction, the first power supply point being positioned closest to the first straight line in the first outer edge; and a second wiring layer provided in the multilayer body, positioned on the negative side of the first radiation conductor layer along the Z axis and on the positive side of the ground conductor layer along the Z axis, electrically connected to the first radiation conductor layer at a second power supply point, and intersecting but not orthogonal to the second straight line in a view along the Z-axis direction, the second power supply point being positioned closest to the second straight line in the first outer edge.

2. The multilayer board according to claim 1, wherein a first region is defined to be a region through which the first straight line passes in a view along the Z-axis direction in a case that the first straight line is moved in a direction orthogonal to the first straight line, the first wiring layer is disposed in both the first region and a region outside the first region in a view along the Z-axis direction, a second region is defined to be a region through which the second straight line passes in a view along the Z-axis direction in a case that the second straight line is moved in a direction orthogonal to the second straight line, and the second wiring layer is disposed in both the second region and a region outside the second region in a view along the Z-axis direction.

3. The multilayer board according to claim 1, further comprising:

a second radiation conductor layer provided in the multilayer body and having a second outer edge in a view along the Z-axis direction, the second outer edge including a third straight line and a fourth straight line;

a third wiring layer provided in the multilayer body, positioned on a negative side of the second radiation conductor layer along the Z axis and on the positive side of the ground conductor layer along the Z axis, electrically connected to the second radiation conductor layer at a third power supply point, and intersecting but not orthogonal to the third straight line in a view along the Z-axis direction, the third power supply point being positioned closest to the third straight line in the second outer edge; and a fourth wiring layer provided in the multilayer body, positioned on the negative side of the second radiation conductor layer along the Z axis and on the positive side of the ground conductor layer along the Z axis, electrically connected to the second radiation conductor layer at a fourth power supply point, and intersecting but not orthogonal to the fourth straight line in a view along the Z-axis direction, the fourth power supply point being positioned closest to the fourth straight line in the second outer edge, wherein the ground conductor layer overlaps the second radiation conductor layer in a view along the Z-axis direction.

4. The multilayer board according to claim 3, wherein the second radiation conductor layer is positioned on a positive side of the first radiation conductor layer along an X axis, the X axis is orthogonal to the Z axis, the first straight line and the second straight line are positioned on a positive side of a first part in the first outer edge except for the first straight line and the second straight line along the X axis, and the third straight line and the fourth straight line are positioned on a negative side of a second part in the second outer edge except for the third straight line and the fourth straight line along the X axis.

5. The multilayer board according to claim 3, further comprising:

a third radiation conductor layer provided in the multilayer body and having a third outer edge in a view along the Z-axis direction, the third outer edge including a fifth straight line and a sixth straight line;

a fifth wiring layer provided in the multilayer body, positioned on a negative side of the third radiation conductor layer along the Z axis and on the positive side of the ground conductor layer along the Z axis, electrically connected to the third radiation conductor layer at a fifth power supply point, and intersecting but not orthogonal to the fifth straight line in a view along the Z-axis direction, the fifth power supply point being positioned closest to the fifth straight line in the third outer edge; and a sixth wiring layer provided in the multilayer body, positioned on the negative side of the third radiation conductor layer along the Z axis and on the positive side of the ground conductor layer along the Z axis, electrically connected to the third radiation conductor layer at a sixth power supply point, and intersecting but not orthogonal to the sixth straight line in a view along the Z-axis direction, the sixth power supply point being positioned closest to the sixth straight line in the third outer edge, wherein the ground conductor layer overlaps the third radiation conductor layer in a view along the Z-axis direction.

6. The multilayer board according to claim 5, wherein the second radiation conductor layer is positioned on a positive side of the first radiation conductor layer along an X axis, the third radiation conductor layer is positioned on a positive side of the second radiation conductor layer along the X axis, the X axis is orthogonal to the Z axis, the first straight line and the second straight line are positioned on a positive side of a first part in the first outer edge except for the first straight line and the second straight line along the X axis, the third straight line and the fourth straight line are positioned on a negative side of a second part in the second outer edge except for the third straight line and the fourth straight line along the X axis, and the fifth straight line and the sixth straight line are positioned on a positive side of a third part in the third outer edge except for the fifth straight line and the sixth straight line along the X axis.

7. The multilayer board according to claim 5, wherein the second radiation conductor layer is positioned on a positive side of the first radiation conductor layer along an X axis, the X axis is orthogonal to the Z axis, a Y axis is orthogonal to the X axis and the Z axis, the third radiation conductor layer is positioned on a positive side of the second radiation conductor layer along the X axis, the first straight line, the third straight line, and the fifth straight line are parallel to the X axis, the second straight line, the fourth straight line, and the sixth straight line overlap one another in a view along an X-axis direction, an end of the first straight line on a positive side along the X axis is connected to an end of the second straight line on a positive side along the Y axis, an end of the third straight line on a positive side along the X axis is connected to an end of the fourth straight line on a positive side along the Y axis, and an end of the fifth straight line on a positive side along the X axis is connected to an end of the sixth straight line on a positive side along the Y axis.

8. The multilayer board according to claim 5, wherein the second radiation conductor layer is positioned on a positive side of the first radiation conductor layer along an X axis, the X axis is orthogonal to the Z axis, a Y axis is orthogonal to the X axis and the Z axis, the third radiation conductor layer is positioned on a positive side of the second radiation conductor layer along the X axis, the first straight line, the fourth straight line, and the fifth straight line are parallel to the X axis, the second straight line, the third straight line, and the sixth straight line overlap one another in a view along an X-axis direction, an end of the first straight line on a positive side along the X axis is connected to an end of the second straight line on a positive side along the Y axis, an end of the third straight line on a negative side along the Y axis is connected to an end of the fourth straight line on a negative side along the X axis, and an end of the fifth straight line on a positive side along the X axis is connected to an end of the sixth straight line on a positive side along the Y axis.

9. The multilayer board according to claim 5, wherein the second radiation conductor layer is positioned on a positive side of the first radiation conductor layer along an X axis, the X axis is orthogonal to the Z axis, a Y axis is orthogonal to the X axis and the Z axis, the third radiation conductor layer is positioned on a positive side of the second radiation conductor layer along the X axis, the first straight line and the second straight line are positioned on a negative side of a first part in the first outer edge except for the first straight line and the second straight line along the X axis, the third straight line and the fourth straight line are positioned on a negative side of a second part in the second outer edge except for the third straight line and the fourth straight line along the Y axis, and the fifth straight line and the sixth straight line are positioned on a negative side of a third part in the third outer edge except for the fifth straight line and the sixth straight line along the X axis.

10. The multilayer board according to claim 1, further comprising:

a second radiation conductor layer provided in the multilayer body, positioned on the negative side of the first radiation conductor layer along the Z axis, overlapping the first radiation conductor layer in a view along the Z-axis direction, and having a second outer edge in a view along the Z-axis direction, the second outer edge including a third straight line and a fourth straight line;

a third wiring layer provided in the multilayer body, positioned on a negative side of the second radiation conductor layer along the Z axis and on the positive side of the ground conductor layer along the Z axis, electrically connected to the second radiation conductor layer at a third power supply point, and intersecting but not orthogonal to the third straight line in a view along the Z-axis direction, the third power supply point being positioned closest to the third straight line in the second outer edge; and a fourth wiring layer provided in the multilayer body, positioned on the negative side of the second radiation conductor layer along the Z axis and on the positive side of the ground conductor layer along the Z axis, electrically connected to the second radiation conductor layer at a fourth power supply point, and intersecting but not orthogonal to the fourth straight line in a view along the Z-axis direction, the fourth power supply point being positioned closest to the fourth straight line in the second outer edge, wherein the ground conductor layer overlaps the second radiation conductor layer in a view along the Z-axis direction, the first straight line is parallel to the third straight line, the second straight line is parallel to the fourth straight line, an X axis is orthogonal to the Z axis, an end of the first straight line on a positive side along the X axis is connected to an end of the second straight line on a positive side along the X axis, an end of the third straight line on a positive side along the X axis is connected to an end of the fourth straight line on a positive side along the X axis, the first wiring layer intersects but is not orthogonal to the first straight line and the third straight line in a view along the Z-axis direction, and the second wiring layer intersects but is not orthogonal to the second straight line and the fourth straight line in a view along the Z-axis direction.

11. The multilayer board according to claim 1, further comprising an annular ground conductor layer provided in the multilayer body and positioned on the positive side of the ground conductor layer along the Z axis, wherein the annular ground conductor layer has an annular shape surrounding the first radiation conductor layer in a view along the Z-axis direction.

12. The multilayer board according to claim 11, wherein the first radiation conductor layer includes the first straight line, the second straight line, a seventh straight line, and an eighth straight line in a view along the Z-axis direction and has a rectangular shape in a view along the Z-axis direction, a first distance is defined to be distance from a center of the first straight line to the annular ground conductor layer in a direction orthogonal to the first straight line, a second distance is defined to be distance from a center of the second straight line to the annular ground conductor layer in a direction orthogonal to the second straight line, a third distance is defined to be distance from a center of the seventh straight line to the annular ground conductor layer in a direction orthogonal to the seventh straight line, a fourth distance is defined to be distance from a center of the eighth straight line to the annular ground conductor layer in a direction orthogonal to the eighth straight line, and the first distance, the second distance, the third distance, and the fourth distance are equal to one another.

13. The multilayer board according to claim 1, wherein the first wiring layer and the second wiring layer each include a matching portion, and the matching portion does not overlap the first radiation conductor layer in a view along the Z-axis direction.

14. The multilayer board according to claim 1, wherein the first wiring layer and the second wiring layer each include a stub portion, and the stub portion does not overlap the first radiation conductor layer in a view along the Z-axis direction.

15. The multilayer board according to claim 1, further comprising an annular ground conductor layer provided in the multilayer body and positioned on the positive side of the ground conductor layer along the Z axis, wherein the annular ground conductor layer has an annular shape surrounding the first radiation conductor layer in a view along the Z-axis direction, and no ground conductor is provided between the annular ground conductor layer and the ground conductor layer at the rigid portion.

16. The multilayer board according to claim 1, further comprising:

a seventh wiring layer provided in the multilayer body, positioned on a negative side of the first wiring layer along the Z axis and on the positive side of the ground conductor layer along the Z axis, and electrically connected to the first wiring layer; and an eighth wiring layer provided in the multilayer body, positioned on a negative side of the second wiring layer along the Z axis and on the positive side of the ground conductor layer along the Z axis, and electrically connected to the second wiring layer.

17. The multilayer board according to claim 16, wherein the seventh wiring layer and the eighth wiring layer do not overlap the first radiation conductor layer in a view along the Z-axis direction.

18. An antenna module comprising:

a first substrate that is rigid; and a second substrate that is flexible, wherein the first substrate includes a first multilayer body having a structure in which a plurality of insulator layers are laminated in a Z-axis direction, a first radiation conductor layer provided in the first multilayer body and having a first outer edge in a view along the Z-axis direction, the first outer edge including a first straight line and a second straight line, a first wiring layer provided in the first multilayer body, positioned on a negative side of the first radiation conductor layer along a Z axis, electrically connected to the first radiation conductor layer at a first power supply point, and intersecting but not orthogonal to the first straight line in a view along the Z-axis direction, the first power supply point being positioned closest to the first straight line in the first outer edge, and a second wiring layer provided in the first multilayer body, positioned on the negative side of the first radiation conductor layer along the Z axis, electrically connected to the first radiation conductor layer at a second power supply point, and intersecting but not orthogonal to the second straight line in a view along the Z-axis direction, the second power supply point being positioned closest to the second straight line in the first outer edge, the second substrate includes a second multilayer body having a structure in which a plurality of insulator layers are laminated in the Z-axis direction, a seventh wiring layer provided in the second multilayer body and electrically connected to the first wiring layer, an eighth wiring layer provided in the second multilayer body and electrically connected to the second wiring layer, and a ground conductor layer provided in the second multilayer body, positioned on a negative side of the seventh wiring layer and the eighth wiring layer along the Z axis, and overlapping the first radiation conductor layer, the seventh wiring layer, and the eighth wiring layer in a view along the Z-axis direction, a length of the second substrate in the Z-axis direction is shorter than a length of the first substrate in the Z-axis direction, and the second substrate is positioned on a negative side of the first substrate along the Z axis and has a region not overlapping the first substrate in a view along the Z-axis direction.

* * * * *